(12) United States Patent
Bell et al.

(10) Patent No.: US 12,069,013 B1
(45) Date of Patent: Aug. 20, 2024

(54) USER INITIATED AUGMENTED REALITY SYSTEM

(71) Applicant: Amazon Technologies, Inc., Seattle, WA (US)

(72) Inventors: Matthew Paul Bell, Sunol, CA (US); Alexander Honda, Sunnyvale, CA (US); Kenneth Mark Karakotsios, San Jose, CA (US); Peter Cheng, Sunnyvale, CA (US); Stephen Michael Polansky, Sunnyvale, CA (US); David Wayne Stafford, Cupertino, CA (US); Amber Nalu, Sunnyvale, CA (US); Yi Ding, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 71 days.

(21) Appl. No.: 17/208,221

(22) Filed: Mar. 22, 2021

Related U.S. Application Data

(63) Continuation of application No. 14/317,664, filed on Jun. 27, 2014, now abandoned.

(51) Int. Cl.
  *H04L 51/046* (2022.01)
(52) U.S. Cl.
  CPC .................. *H04L 51/046* (2013.01)
(58) Field of Classification Search
  CPC .................................................. H04L 51/046
  See application file for complete search history.

(56) References Cited

U.S. PATENT DOCUMENTS

| | | | | |
|---|---|---|---|---|
| 2006/0224950 | A1* | 10/2006 | Takaai | G06V 30/413 715/233 |
| 2006/0235700 | A1* | 10/2006 | Wong | G10L 15/26 704/E15.045 |
| 2011/0313597 | A1* | 12/2011 | Wilson | G01C 23/00 701/3 |
| 2012/0131024 | A1* | 5/2012 | Park | G06Q 10/109 707/E17.069 |
| 2013/0086077 | A1* | 4/2013 | Piippo | G06F 16/951 707/E17.058 |
| 2013/0135348 | A1* | 5/2013 | Anzai | G06T 19/006 345/633 |
| 2014/0245120 | A1* | 8/2014 | Schwartz | G06V 30/32 715/226 |
| 2014/0324828 | A1* | 10/2014 | Hanses | G06F 16/9562 707/722 |

* cited by examiner

*Primary Examiner* — Jennifer N Welch
*Assistant Examiner* — Parmanand D Patel
(74) *Attorney, Agent, or Firm* — Pierce Atwood LLP

(57) ABSTRACT

An extendable augmented reality (AR) system for recognizing user-selected objects in different contexts. A user may select certain entities (text, objects, etc.) that are viewed on an electronic device and create notes or additional content associated with the selected entities. The AR system may remember those entities and indicate to the user when those entities are encountered by the user in a different context, such as in a different application, on a different device, etc. The AR system offers the user the ability to access the user created note or content when the entities are encountered in the new context.

18 Claims, 20 Drawing Sheets

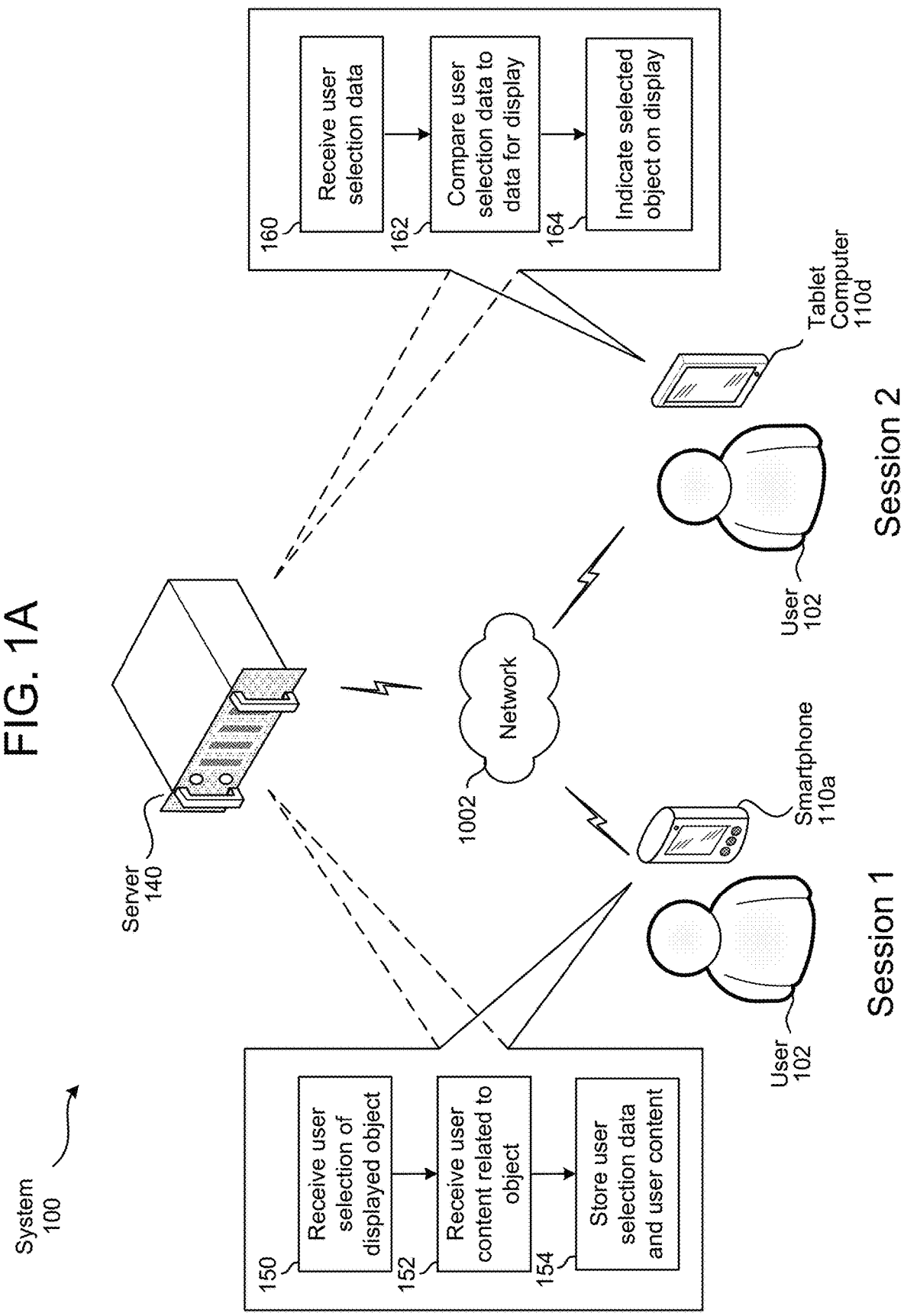

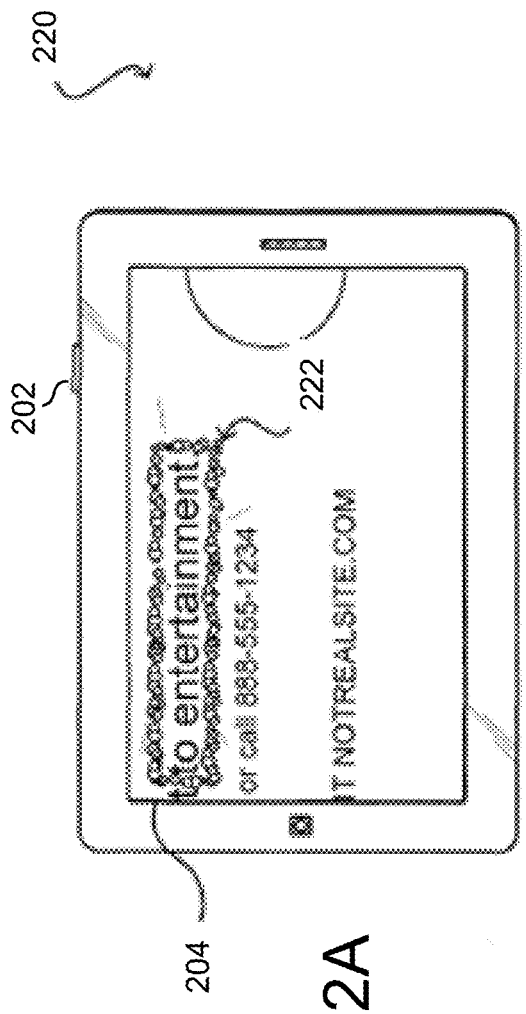
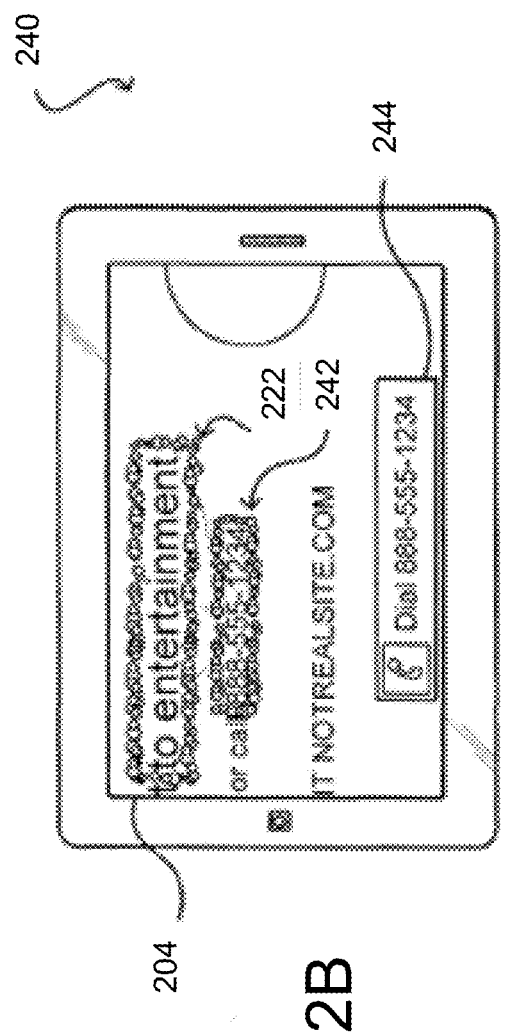
FIG. 2A
FIG. 2B

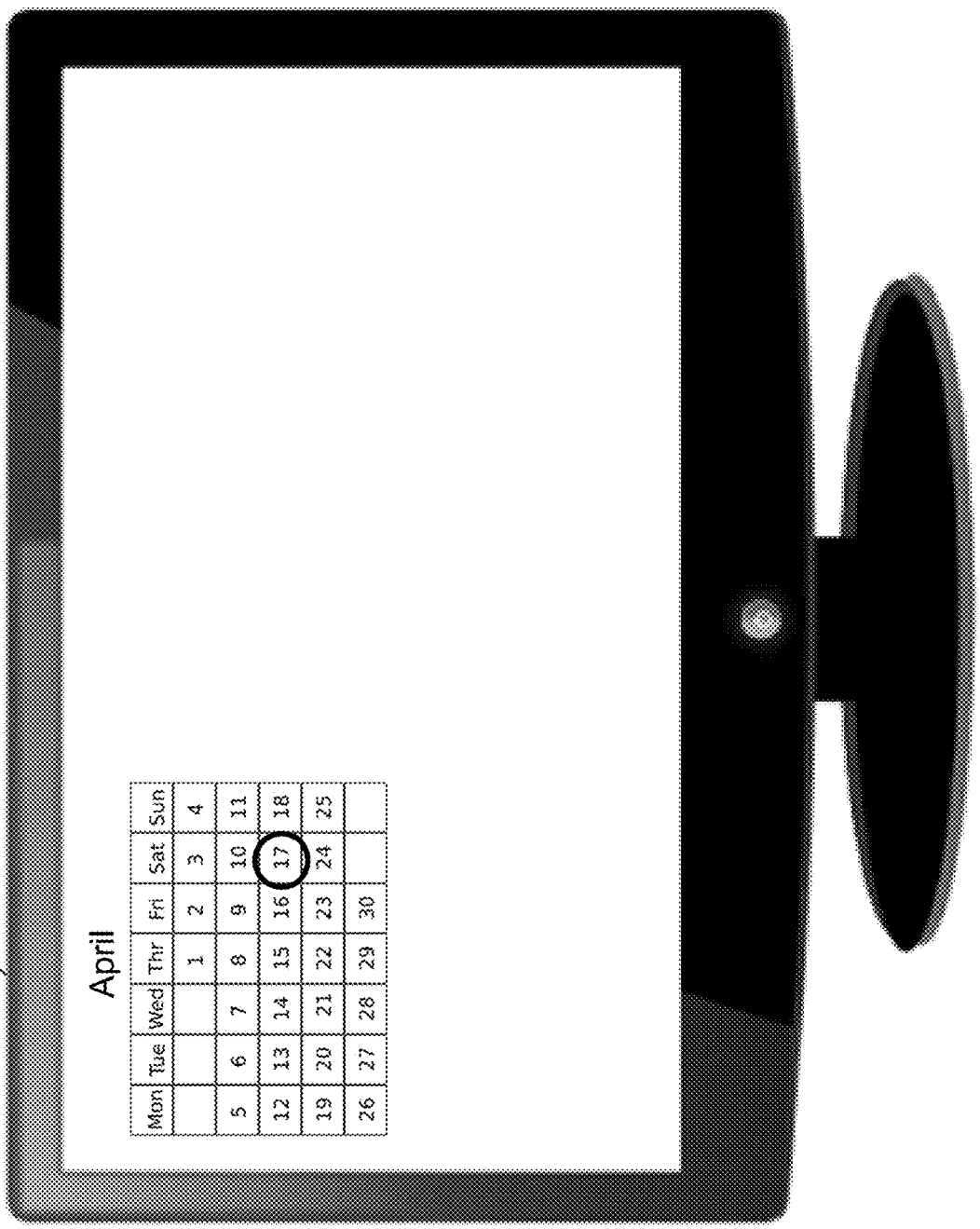

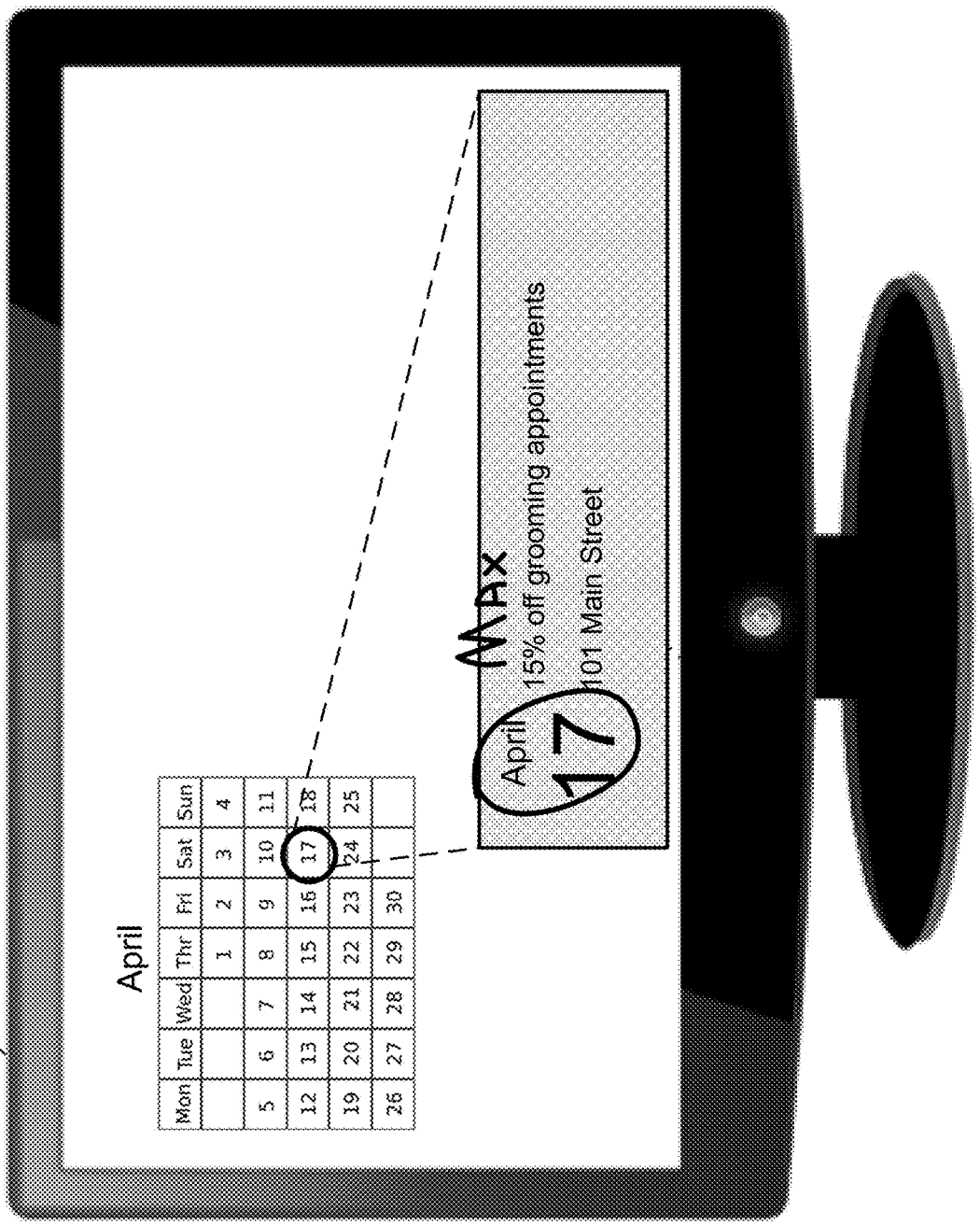

USER INITIATED AUGMENTED REALITY SYSTEM

CROSS-REFERENCE TO RELATED APPLICATION DATA

This application is a continuation of, and claims the benefit of priority of, U.S. patent application Ser. No. 14/317,664 filed Jun. 27, 2014, and entitled "USER INITIATED AUGMENTED REALITY SYSTEM," in the names of Matthew Paul Bell, et al. The contents of which are expressly incorporated herein in its entirety.

BACKGROUND

People are increasingly utilizing portable electronic devices to perform a wide variety of tasks. As an example, people can utilize a camera of such a device to capture an image of an object. For example, a user can use a camera to capture a still image or video on things in the environment in the camera's field of view. There might be multiple objects in an image or video, and the user may not be able to determine what the objects are or know much about them.

BRIEF DESCRIPTION OF THE DRAWINGS

For a more complete understanding of the present disclosure, reference is now made to the following description taken in conjunction with the accompanying drawings.

FIGS. 1A and 1B illustrates an example of an augmented reality system for determining and indicating supplemental content availability for stored content in accordance with various aspects.

FIGS. 2A-2D illustrate an example interface that conveys to a user which objects are recognized in a current view, as well as actions that can be accomplished using those objects, that can be utilized in accordance with various aspects.

FIGS. 3B-3H illustrate a device operating an enhancement to an augmented reality system in accordance with various aspects.

DETAILED DESCRIPTION

Figure 1B:
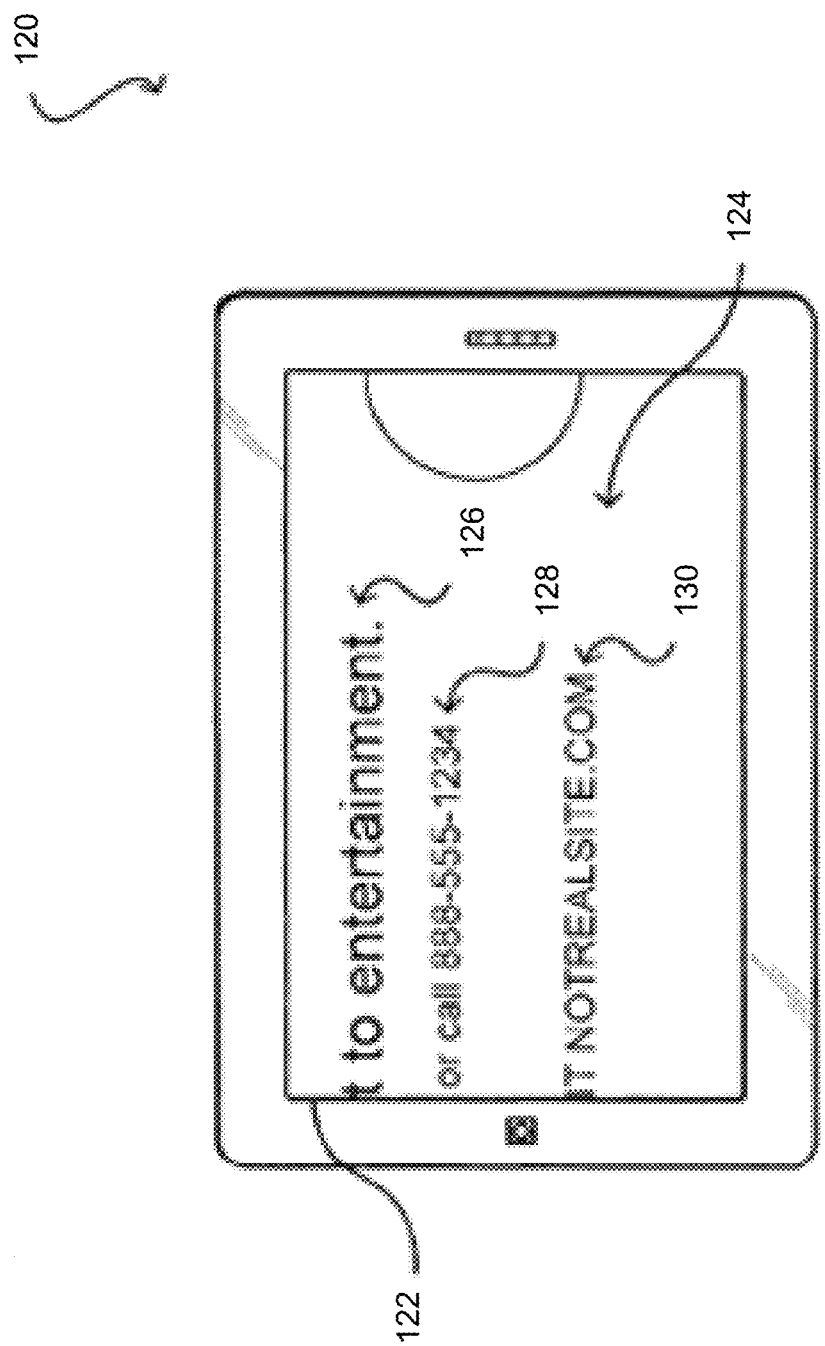

Computing devices may assist users in identifying previously unidentified documents or things. The devices may also identify certain text in a document and provide the user with an device-executable action associated with the text. For example, a device may take an image of a business card and allow a user to perform various functions such as calling a number on the business card, sending an email to an email address on the business card, locating the business address on a map program, or the like.

To allow an augmented reality systems to provide more functionality to a user, offered is an augmented reality system that may perform object recognition based on items being presented to a user on-screen, in addition to objects that may be recognized by a device's sensors. In this way, data from applications being operated by a device, or data resulting from a capture of a screen's content, may be processed by the augmented reality system to obtain supplemental content or additional user-selectable functions for presentation to a user. Such supplemental content or additional user-selectable functions may be considered system generated data or content.

Further, the augmented reality system may be configured to receive user input regarding objects the user wishes to designate for later viewing or consideration. This may be done through user interaction with a user interface that allows the user to indicate certain objects, and accompany those objects with a note, voice recording, or other user-generated content. The system may then store the content with the object and then indicate to the user whenever the user again encounters the indicated object, even if that encounter is in a different context. The user may then access the user-generated content (and potentially other supplemental content and/or selectable functions) through a user interface as described below.

FIG. 1A illustrates an augmented reality system in accordance with various aspects of the present disclosure. A system 100 includes a server 140, a smartphone 110a and a tablet computer 110d connected over network 1002. During a first session of device operation, at Session 1 a smartphone 110a is operated by a user 102. The smartphone 110a renders an object on its display that the user 102 wishes to select for some purpose, such as a reminder to purchase an item, schedule an appointment, read an article, etc. The smartphone 110a then receives an input indication (i.e., user selection) that is determined to be a selection of the object (150). The smartphone 110a also receives the user content related to the object (for example, the note) (152), and stores the user selection data and user content (154). For example, the smartphone 110a may create a note related to the object for the user 102 to refer to later. As described below, the user selection data may include a variety of information related to selection of the object such as an identifier of the user 102, an identifier of the selected object, information related to the context of the object's selection (such as an identifier of the smartphone 110a, a screenshot of the display from when the device received the selection of the object (i.e., during Session 1), information about the applications operating at Session 1, etc.) and/or other information. The user selection data and user content may be stored on remote server 140.

During a later session, Session 2, a different device may be operated by the user 102, for example tablet computer 110d. The tablet computer 110d may be associated with a profile the user 102 through a password, username, or other authentication so the tablet computer 110d recognizes the user 102. When the user 102 operates the tablet computer 110d, the tablet computer 110d may communicate with server 140 and identify to the server 140 that user 102 is now operating tablet computer 110d. Or the tablet computer 110d may be previously associated with the user 102. The tablet computer 110d and/or the server 140, receives the user selection data (160). The tablet computer 110d displays data to the user 102 related to whatever operations the user 102 is performing on the tablet computer 110d at Session 2. Data used to render the display on the tablet computer 110d at Session 2 may then be processed by the tablet computer 110d and/or the server 140 to determine if any objects are recognized in the data and will be shown on the display, as described below in reference to the augmented reality system. The tablet computer 110d and/or the server 140 may then compare the user selection data to any recognized objects in the data used to render the display on tablet computer 110d to determine if any object previously selected by the user 102 and indicated in the user selection data is being displayed on tablet computer 110d. In another example the user selection data may be compared to the data used to render the display of tablet computer 110d (162) without first (or at the same time as) performing object recognition using the augmented reality system. If any objects on the display of tablet computer 110d are the same as objects previously selected by the user 102 and included in the user selection data, the tablet computer 110d and/or server 140 may indicate that an object appearing on the display of tablet computer 110d is one that the user 102 has previously selected (164). This indication may take the form of a visual indication (such as a special border around the object or general indicator light), an audio or haptic indication (such as a sound or vibration generated by tablet computer 110d), or other indicator. If the tablet computer 110d receives an indication (for example, from user 102) to retrieve and/or display more information about the selected object that is appearing on display of the tablet computer 110d, the tablet computer 110d may display additional information about the object, including the note the user made about the object, information about the context in which the user previously selected the object, information found about the object by the augmented reality system, or other information.

Using a system like the one described above, a user may select an object while operating a device in one context, and have the system remind the user when the same object is encountered when the user operates a device, even a different device, in another context. Further details are described below in the context of an augmented reality system that is expandable to incorporate other data sources, including data regarding objects selected by a user.

In augmented reality systems, such as that disclosed herein, a computing device may be enabled to analyze information, such as sensor data captured by one or more sensors of the computing device to attempt to identify one or more objects represented in the information. The system may then obtain supplemental content, or suggest potential functions for user execution, based on the object(s) represented in the information. Supplemental content may include information about a recognized object that is not otherwise discernable from the information available to the user's device absent the augmented reality system. Such supplemental content (also called system generated content or data) may come from a variety of content providers or sources that are available to the augmented reality system. Such content providers or sources may include, for example, augmented reality system administrators, other users of the present or similar augmented reality systems, online resource content generators (for example content generated for websites such as Wikipedia, Amazon, Yelp, etc.), authors (e.g., authors of science text books, photography books, art history books, fiction literature, non-fiction literature, etc.), or any number of other content sources.

Sensor data can include, for example, images or video data acquired by a camera, audio acquired by a microphone, position data acquired by a global positioning system, and any other appropriate data capable of being acquired by one or more sensors (or other such components) of a computing device. Sensor data may also come from sensors external to a user device such as an exercise band, external camera, etc. The objects can include tangible and/or intangible objects, such as may include, for example, text, bar codes, songs, movies, products, weather-related information, and other types of items, events, and/or occurrences. The augmented reality system may match the recognized object to other information sources and retrieve information from those sources to present to the user. This matching may occur substantially in real-time, to provide the user with an experience of having supplemental content/functionality available while engaging with primary content (Such as that detected by the device's sensors), thus augmenting the user's interaction with his/her environment, hence the name "augmented reality."

The augmented reality system may provide the user with supplemental content/functionality without the user necessarily having to provide information about what objects are being recognized, or without the user having to specify what domain or topic the user is interested in. The augmented reality simply processes the available data, such as data available from the sensors of or connected to the user's device, and provides the user with the available supplemental content/functionality as determined from the available data. In this manner the augmented reality system differs from domain specific applications (such as song recognition software) which is configured specifically for certain domains (e.g., music recognition) or applications which are instructed what to recognize a priori.

In an example of using live sensor data to obtain supplemental content, the user may use the computing device to view and analyze a document that may contain information that might be of interest to the user. This information includes, for example, a body of text, a phone number, and a web address. The document may include both text-based and non-text based information. For example items such as the picture of a product, music album cover, poster, road sign, etc. may include both text-based and non-text based information. Although illustrated as a document the device may also capture an image of an item that is not a document such as a product, landmark, etc. Such an item may lack text-based information but may include image based information. The user might want to acquire any or all of this information for any of a number of reasons, and/or to perform any number of actions such as to update contact information, call the number, access a website associated with the address, and so on. In order to obtain this information, the user can position the computing device 110 such that at least the relevant portion of the document is within a field of view of at least one camera of the computing device. The resulting image can then be displayed on a display screen of the computing device, as illustrated in the example situation 120 of FIG. 1B. The image 122 can be a still image that was captured by the camera, or can be a frame of a "live" view as captured by a video mode of the camera, camera mode of the device, etc. As illustrated, the image 122 can include information 124 from the document. Each instance of captured information can be referred to as a representation of an "object," which can be analyzed by software running on, or remote from, the device. In this example, the objects that can be recognized from representations of those objects in the image can include objects such as a string of text 126, a phone number 128, and a web address or uniform resource locator (URL) 130. Various other types of objects can be recognized in other examples as discussed and suggested elsewhere herein. The image can be processed to attempt to recognize the text, which then can be utilized by the user for any of a number of different purposes.

Using a conventional approach, the user can cause the image to be captured and uploaded to a server that is capable of running one or more image recognition or analysis algorithms on the image to attempt to identify text within the image. This can include, for example, at least one optical character recognition (OCR) algorithm.

While the process of obtaining information for recognition may involve using device sensors to capture "real time" or live information, such as images seen by a device's camera(s) 106, heard by a device's microphone(s) 114, information that is not generated by device's sensors, such as emails, messages sent over a multimedia messaging service (MMS) or short message service (SMS), other communications, media content such as images/videos/audio files previously stored in a device's memory, media content that is stored remotely but otherwise available to a computing device (for example, media content stored on a remote cloud server), data from a website, or other information available to a device but not necessarily taken from the device's sensors. As explained below, information for recognition may also be obtained based on data that is being presented to a user on a display of a device. That information may be taken from the image on the display or from underlying applications that are being viewed by the user. Information may also be selected by a user for specific recognition or recollection later by the system, even if encountered later by a user using a different application or device. Thus the system may be configurable by the user and allow the user to more easily access desired information.

Aspects of recognizing information as detected by a device, and determining actions to perform based on recognized information, such as the information illustrated in FIG. 1B, are describe below.

In addition to simply displaying a video feed or content item, such as that shown in FIG. 1B, various aspects may also provide an interface that enables the device to convey which objects in the information have been recognized, such as by displaying a set of virtual "fireflies" or other types of graphical elements over a live view of image (e.g., video) data being acquired by the device or over previously stored or otherwise non-live content to indicate that certain objects in the content have been recognized. The graphical elements may activate in a manner to indicate that some object in the content may be recognized by the device, such as by creating a dynamic bounding box around a representation of each such object or forming an appropriate shape on the display. For example, the graphical elements may be animated or otherwise configured to appear to gather by, be contained in, or otherwise associated with at least one launch button, for example, which may include a physical hardware button, a virtual button displayed on a touch screen, or another such user-selectable element where selection of the launch button by the user may instigate a further action, as detailed below. The graphical elements may then change their appearance upon selection of the launch button. For example, in response to recognizing an object, some or all of the graphical elements can be rendered to form an animated shape, such as by being animated to appear to move across the display 204 and form an animated bounding box 222 proximate to the representation of the recognized object as illustrated in the example situation 220 of FIG. 2A. In some aspects, the graphical elements may be animated in a first state when certain (or no) information is to be conveyed and a second state when other information is to be conveyed, where the first and second states can vary in aspects such as maximum brightness, average intensity, color range, average brightness, density, flashing rate, and the like. As mentioned, some of the graphical elements might appear to move and some might just appear near the representation of the object. The graphical elements may also form different shapes and/or take a different appearance depending on analyzed content or the recognized objects within the content.

A device may enter a discovery mode in response to a user selection (such as selecting a discovery application), in response to power on (or wake up) of the device or through some other way. As explained below, the device may also perform discovery operations on content in the background while the user performs other operations, particularly for non-live or stored content items that are stored on the mobile device, or are otherwise accessible to the mobile device (such as a collection of media stored on a cloud). The system may even perform object recognition or identification (and supplemental content identification) on content items before they are even accessed by a user device. Recognition and identification are used interchangeably for purposes of this description. Once in discovery mode the device may continuously process the device sensor data to attempt recognition/identification of items or may begin a recognition attempt in response to a user depressing a button 202, or the like. By beginning recognition attempts in response to a button press (or the like) the device allows the user to position the device in a desired way, for example to isolate a desired document, prior to attempting recognition. In some aspects, however, a device might not include any buttons at all and might be controlled only through a combination of visual (e.g., gesture) and audio (e.g., spoken) commands such that a user can control the device without having to be in contact with the device.

Different recognition algorithms and/or services may be used to perform object recognition to recognize different types of objects. For example, a string might be recognized as text that matches a determined pattern, such as a pattern indicating the text is a phone number or URL. Accordingly, information for these objects might be processed by a different algorithm or process. The different types of processing therefore can result, in at least some aspects, in different objects being recognized at different times. Similarly, different objects might be recognized at different times due to changes in the image that enable different portions to be recognized at different times, among other such options.

In response to a second object being recognized, as illustrated in the example situation 240 of FIG. 2B, the graphical elements may create a bounding box 242 or other such indication about the second recognized object, here a phone number. Such presentation can indicate to the user that both objects surrounded by bounding boxes have been recognized and/or identified. In different aspects, the graphical elements may bound the phone number at different times, such as when the string is identified as a text string, when the string is identified as a phone number, or when information for the phone number is located, among other such options. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

In various aspects, a type of the object can also be determined. In at least some aspects, this can include at least an "actionable" or a "non-actionable" type, or equivalent(s). For example, a text string such as "to entertainment" might be a portion of text that can be handled as normal text, such as for copying and pasting, which might not be considered an actionable object/text in at least some aspects (while being considered actionable in others). Objects/text such as a phone number or URL might be considered to be actionable objects as the computing device can perform at least one specific function with respect to each of these objects that might be of interest to a user. For each actionable object, every recognized object, or at least one recognized actionable object, for example, the interface can provide a user-selectable input, icon, or element associated with the representation of that object. In other aspects, a user-selectable input or element might be provided for each recognized object, or a specific subset of recognized objects, among other such options. Objects such as barcodes and quick response (QR) codes might be considered either actionable or not actionable objects in different aspects. Similarly, objects such as songs might be considered actionable if the software is linked to a song identification and/or purchasing source, and text might be considered actionable if a translation is available.

In various aspects, the user-selectable icon can take the form of what will be referred to herein as a "ribbon" 244, although various other types of elements or objects can be utilized as well within the scope of the various aspects as discussed and suggested elsewhere herein. In this aspect, a ribbon 244 may be comprised of at least two parts: information about the object and information about at least one action that can be taken. As illustrated, the ribbon can list the phone number that was recognized, such that the user can determine whether the phone number was properly recognized before using the number. The ribbon can also identify the action that can be taken, in this case using a phone icon and including the word "dial," although various other indications can be used as well. In some aspects the user might be able to select from different options or cause a specific action to be associated with a type of object, such as where a user would like to send a text, or make a video call instead of a conventional phone call, among other such options.

In some aspects, a ribbon might have two touch targets: a first target that comprises approximately 80% of the area of the ribbon that enables the user to select the primary action, and a second target of approximately 20% of the ribbon area that enables the user to go to a detail card, or other such element, that provides other actions or plugins applicable to that object, as well as potentially a copy of the image that was used to recognize the object for context, among other such possibilities. As discussed, a ribbon in some aspects can include at least three things to display: an image relating to the object, a title or name of the object, and a source of disambiguation, such as an author or artist name to help a user distinguish that object from other objects with the same or similar names or titles, etc. Ribbons (or other user-selectable icons) can also provide different actions for various types of objects. For example, a ribbon can include an action to purchase or download a song that was recognized from audio data, or to play a movie that was recognized from audio data and/or video data captured by one or more sensors of the device.

In this example, the ribbon is displayed near the "bottom" of the display for the current orientation, although other places can be utilized as well. In at least some aspects, the ribbon 244 can remain on the screen for at least a determined period of time, whether or not the corresponding representation of the object is still visible in the display or otherwise accessible to the device. For example, a user might point the camera towards the number in order to have the phone number accessible via the device. Once captured and/or recognized, the user might no longer want to continue to hold the device with the number in the field of view of the camera, and might want to bring the camera to a more comfortable position in order to touch the ribbon or otherwise check and dial the number. In some aspects, the user might want the device to store the number to dial at a later time that is more convenient for the user. In any of these or other such cases, it can be desirable for the device to display the ribbon for a period of time, or at least enable the user to access the ribbon at the appropriate time.

Figure 2C:
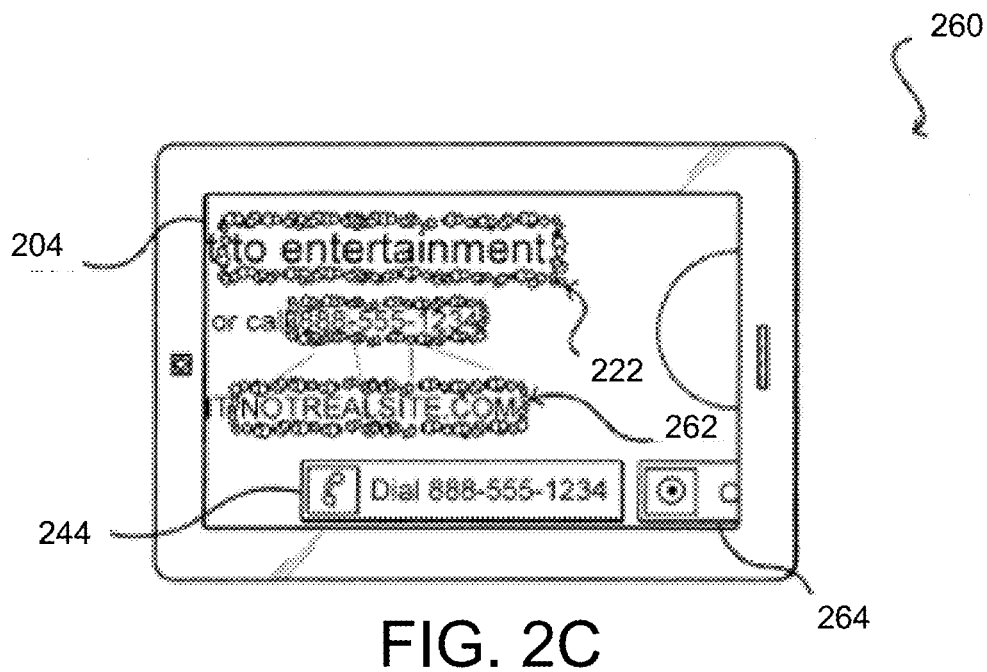

As illustrated in the example situation 260 of FIG. 2C, the device might recognize additional objects as well, such as by using additional algorithms, plugins, services, or processes or when the portion or quality of the captured image changes, among other such options. In this example, another object is detected, which causes an additional bounding box 262 to be created. Since the object is actionable, an additional ribbon 264 can be created that enables the user to cause a specific action to be performed with respect to the newly recognized object. In some aspects where multiple actions can be performed with respect to an object, multiple ribbons can be displayed on the display screen. In other aspects, a ribbon might have more than one label, with each label referring to a different possible action. For example, the sensor data might include a representation of a movie theater sign, a newspaper advertisement, musical sounds and/or various other objects, where a user might want to call (e.g., for reservations/tickets) or learn more information about the object (see artist's website, watch movie trailers, view menu, etc.) before doing so. Labels also can indicate functionality such as an ability to visit a third party's social media page (e.g., a social media page for a restaurant or musical artist represented in the poster/ad). In the illustrated example the first ribbon is displayed in a center portion of the display with additional ribbons added to the right, although in other aspects the newer ribbons can be presented in the center and can be animated to appear to "push" the older ribbons to the right or left, among other such options. In order to access the other ribbons, then, the user can swipe, scroll, or otherwise navigate to those ribbons using any of a number of navigational approaches used for such purposes.

Figure 2D:
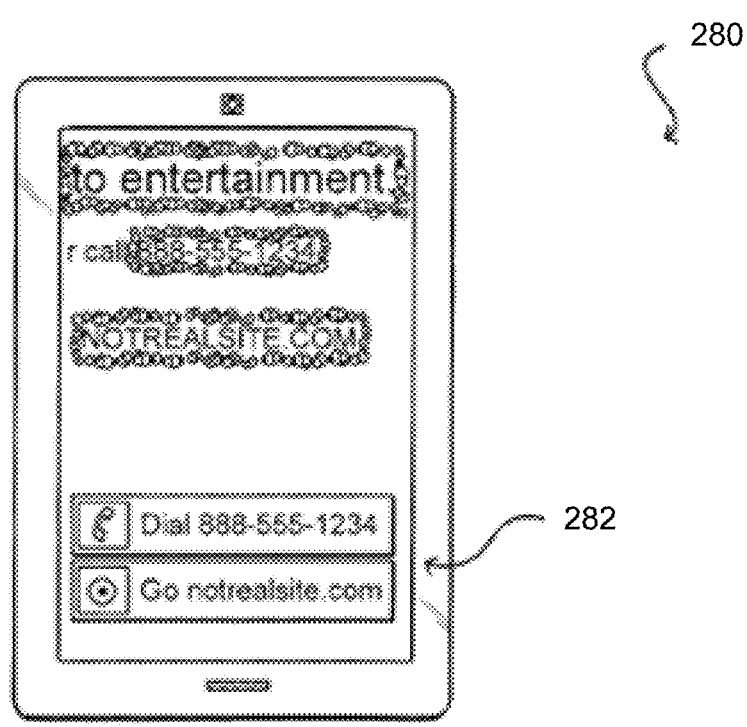

As illustrated in the example situation 280 of FIG. 2D, the ribbons 282 can also be displayed to appear to be stacked vertically on top of one another, among other such options. In this example, the first ribbon appears on top with the others appearing below, while in other aspects the most recently generated ribbon can always appear on top, among other such options. As new ribbons are generated and the number of ribbons exceeds the number of ribbons that can be displayed, as may be a fixed, variable, or user-configurable number, for example, the older ribbons can be "pushed" off screen, but available to the user via one or more navigational approaches as discussed elsewhere herein. Various other approaches for displaying, moving, and navigating ribbons or other selectable elements can be utilized as well within the scope of the various aspects.

In many instances, as mentioned, there can be multiple actions that can be taken. For example, a phone number might be used for text messaging, a voice call, or a video call. If a URL contains a foreign word, actions might include opening the URL in a Web browser or translating the word. Various other actions can apply as well. Accordingly, in at least some aspects the types of action may be selectable by a user, or the algorithms for suggesting these actions might be ranked or otherwise prioritized. For example, an object being recognized as a URL might always take precedence over the object being identified to contain a foreign term, as the user will be more likely on average to want to follow the URL than to translate it. In some cases, such as where a user can make a voice, video, or VOIP call, for example, the device might analyze the user's historical usage or present the user with options or preferences, for example, that can determine which action to provide to the user in a ribbon. In at least some aspects, the ribbon can contain an option that enables the user to view other available actions, and select one or more of those actions to be performed.

The various processing steps described here may be performed entirely by one device or divided among multiple devices. For example, a local user computing device may perform certain functions and a remote server may perform other functions. In a remote computing configuration, more complex processing tasks, such as image processing, recognizing actionable objects within content, etc. may be performed by a remote server. The same remote server (or group of servers) may perform object recognition on live feed images as well as non-live content.

In order to provide at least some of the functionality discussed herein, in at least some aspects an amount of image processing (or pre-processing) can be performed on the local (i.e., user) computing device. This can include, for video data, identifying regions such as edges or sharp transitions that are likely to correspond to recognizable objects. For audio data, this can include identifying a beat or other such patterns. For example, the detection of unique or interesting features or characteristics can be performed on the local device, in order to determine whether there is sufficient data to warrant sending an image (or data extracted from the image) to a remote server. In some embodiments, there can be an amount of pattern matching performed on the device to determine whether the features likely correspond to a representation of a recognizable object, in order to cause the fireflies to move to that location before a full recognition is done and/or image data is sent to a server. Further, basic pattern matching can help the device to determine a likely type of object, such as whether the object is a body or string of text, a quick response (QR) code, etc. The behavior and/or characteristics of the graphical elements may then change as appropriate before data is sent to and/or received back from a server, reducing the lag time experienced by users of the device. Similarly, if a quick match on the device can identify an object as something already recognized, for which there is data stored on the device, the graphical elements may use a color, shape, and/or size appropriate for that object, for example, and a corresponding ribbon can be presented without need to contact a remote server or service, etc.

In some aspects, a device may attempt to obtain information based on a current location of the device, as may be determined using a global positioning system (GPS) component, electronic compass, or other such sensor or approach. If other devices have recognized and/or identified objects at that location, even pointing in a similar direction, then the device may attempt to have the graphical elements act based upon what the device anticipates it will find before any or all analysis is completed. For example, if the user is in a movie theater and there are several movie posters on the wall, the device can know (based on information from other devices obtained that day or over a recent period) what the user is likely to encounter, and can pre-fetch that data and/or have the graphical elements act based on the expected encounter(s). In at least some embodiments, prefetching the result data can prevent similar images from being repeatedly uploaded and analyzed, thereby conserving bandwidth and processing capacity.

The augmented reality functionality, including object recognition and identifying supplemental content or potential user-selectable functions, may be available not only based on data from a device's live sensors (such as a camera, microphone, etc.), but also from data that is being generated by underlying applications and presented to a user. For example, a device may be configured to enter into an augmented reality (AR)/recognition mode, where contents of the display may be analyzed for recognized objects or other AR functionality. The device may receive an indication from a user, such as a push of a physical button or virtual button (such as on a touch interface), receiving an audio command, detecting a gesture by a camera(s) or specific motion of the device, such as a tilt or other motion recognized by an accelerometer, gyroscope, or other inertial sensor. The recognition mode may be enterable when the user is operating the application, when the user is interacting with the operating system, or generally whenever the user is interacting with the device, depending on system configuration. When the recognition mode is activated, the user interface may generate a visual indicator on the user interface to visually acknowledge entering a recognition mode.

Figure 3A:
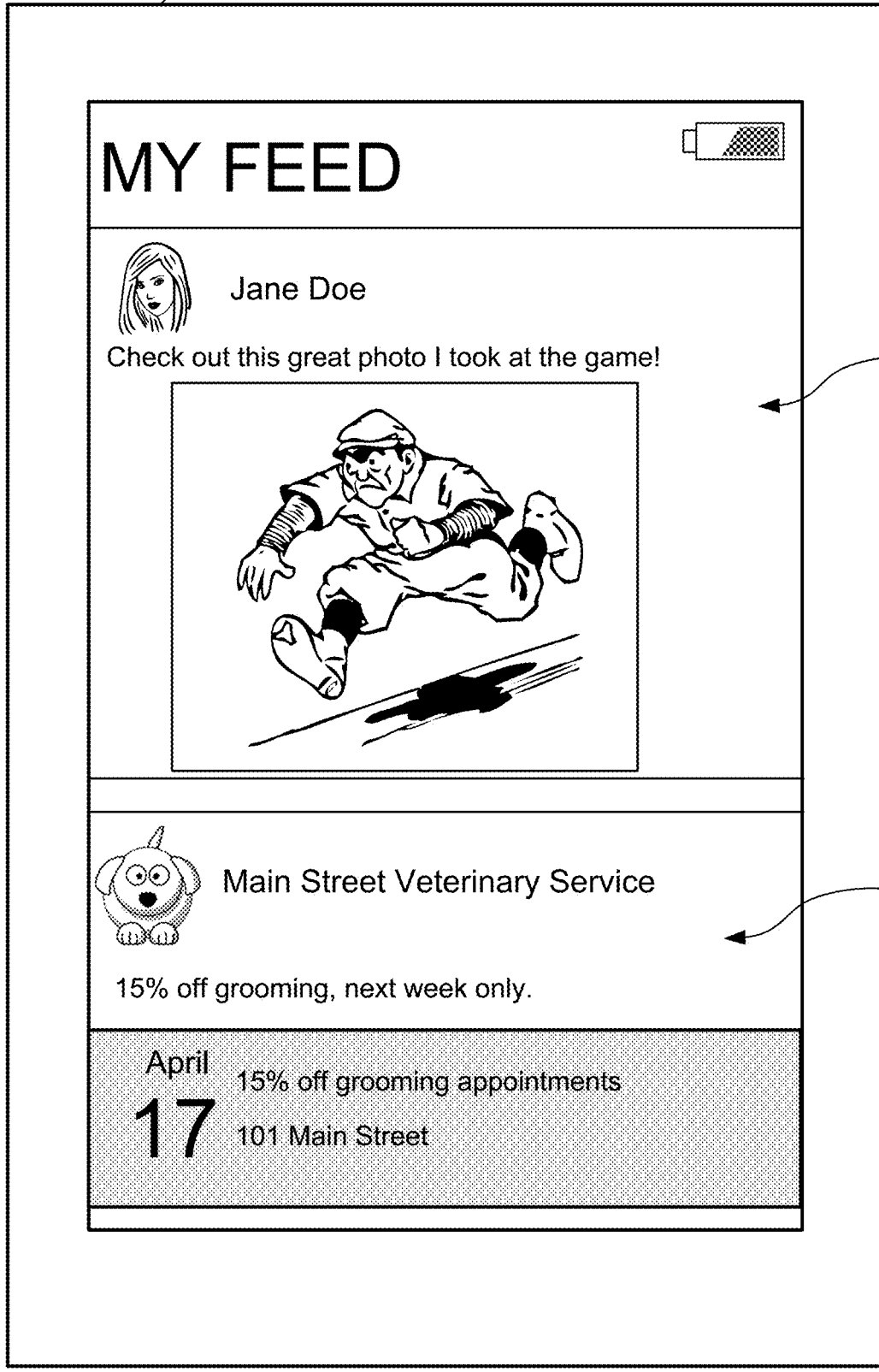
FIG. 3A illustrates a device operating a social media feed.

For example, FIG. 3A illustrates a user operating a social media application (entitled "My Feed") on device 110. As shown in FIG. 3A, the social media application shows two posts, one post 302 from "Jane Doe" shows a photograph and a description of the photograph from Jane Doe. The other post 304 shows an advertisement for grooming services from a veterinary service. If the user desired to activate the recognition mode, the user would perform the action to activate the mode (for example tilting the device backward and forward in rapid succession) and the device would receive the indication to activate the recognition mode. The device may then enter the recognition mode.

Once the device enters recognition mode the device will begin sending data to the recognition system components. That data may include data from the display of the device (for example, data used to render the images on the screen). That image data may then be processed to determine if any recognizable objects are found, as described in other portions of this document. In addition to the image data, the AR system may use data from underlying applications that are being operated/viewed by the user when recognition mode is activated. That data may include image data, but may also include other data such as text data, location data (for example, from a map application), network data (for example, from a phone application), or any other type of data that may be used by the AR system to identify objects. Individual applications may be made aware of the types of data operable by the AR system either while on the device (for example through interactions mediated by the device's operating system), at the time of programming when the application is being configured by a developer, or in some other manner. During runtime the application may be pushed an indicator that the recognition mode has been entered, after which the application may send the AR system the data from the application that is desired by the AR system and relevant to what the user is seeing on the device. Data may also be sent to the AR system from other components of the device, such as the sensors, operating system, etc. to assist in the recognition process. Based on the various data received by the AR system, it may perform recognition processing to determine if any identifiable objects are being viewed by the user at the time the recognition mode was operated. Based on any recognized objects, the system may also identify supplemental content or potential user-executable functions for the recognized objects, also as described in other portions of this document. That supplemental content/potential user-executable functions may then be presented to the user in any number of ways, including those described below. The ability to recognize objects as well as the post-recognition content/functions that are presentable to the user may make user of the pluggable AR system structure described below.

Figure 3B:
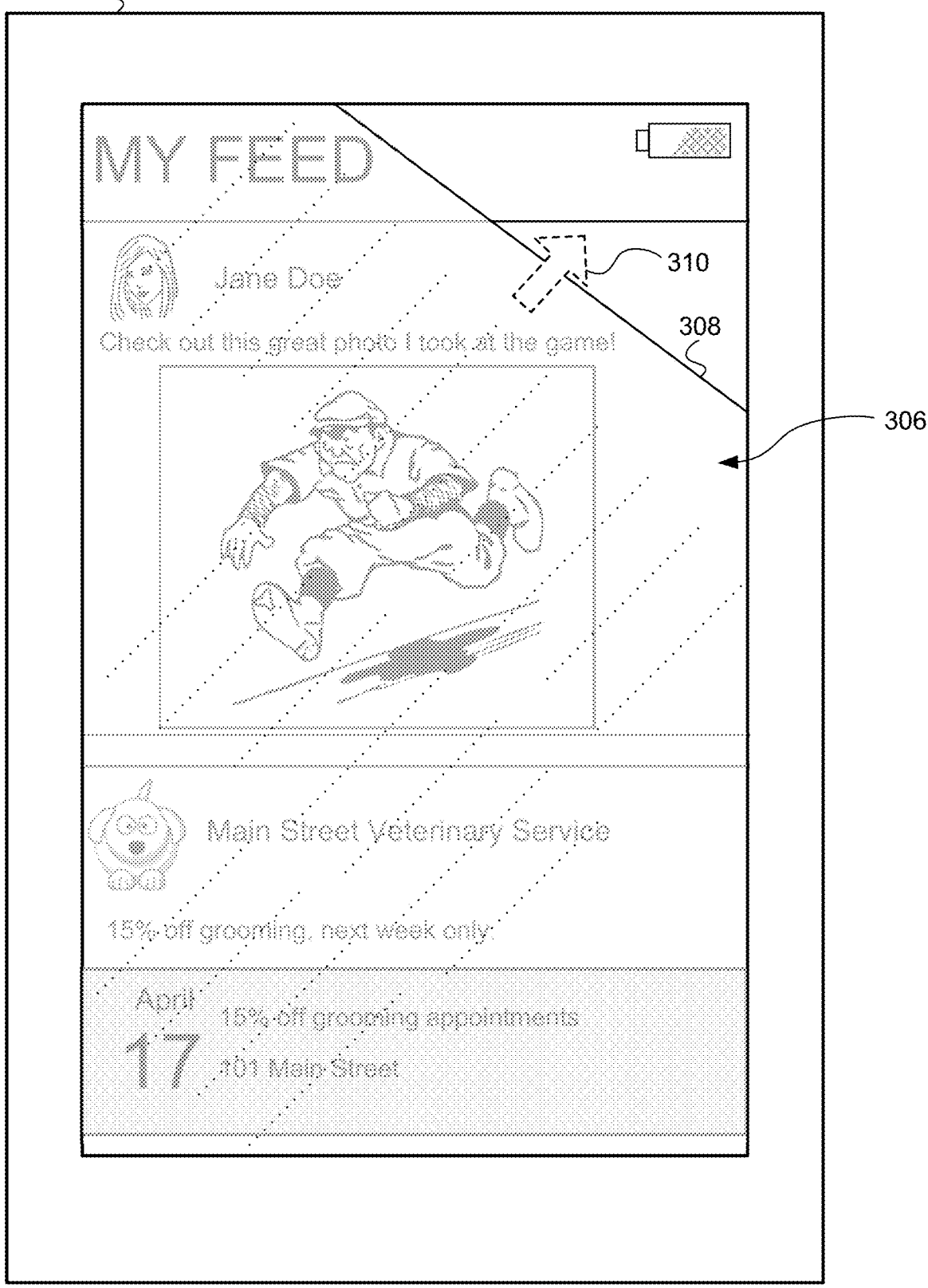

While data is being collected by the AR system, once the device enters the recognition mode, the device may also activate a visual indicator to the user that recognition mode has begun. One example of such an optional visual indicator is shown in FIG. 3B. The precise configuration/movement/appearance (and even existence) of the visual indicator is configurable. As shown in FIG. 3B, a translucent overlay 306 may be animated to look as if it is appearing over the contents of the screen starting at one part of the display (for example in the bottom left corner) and moving to cover the entire display (for example in the direction of arrow 310). The contents that were on the screen when the recognition mode was activated may remain visible, but may become opaque or otherwise obscured by the overlay 306. For example, as shown in FIG. 3B, displayed objects that are below line 308 are obscured but objects above line 308 are not obscured. Once the overlay completes its animation, the entire screen may appear obscured.

The overlay may stay displayed on the device 110 while the recognition mode is activated. When the AR system has completed its recognition process, recognized objects on the screen may be altered in their visual appearance. For example, by being surrounded by graphical elements as described above. In another example, recognized objects may become unobscured, as if a window has opened in the overlay to show the recognized objects underneath. Thus, the objects are displayed normally, but pixels of the display that are not displaying the recognized objects are rendered to have a different appearance that causes the underlying content to appear as if a partially opaque surface is layered on top. In another example, recognized objects may appear to rise out over the overlay. Other configurations are also possible.

Figure 3C:
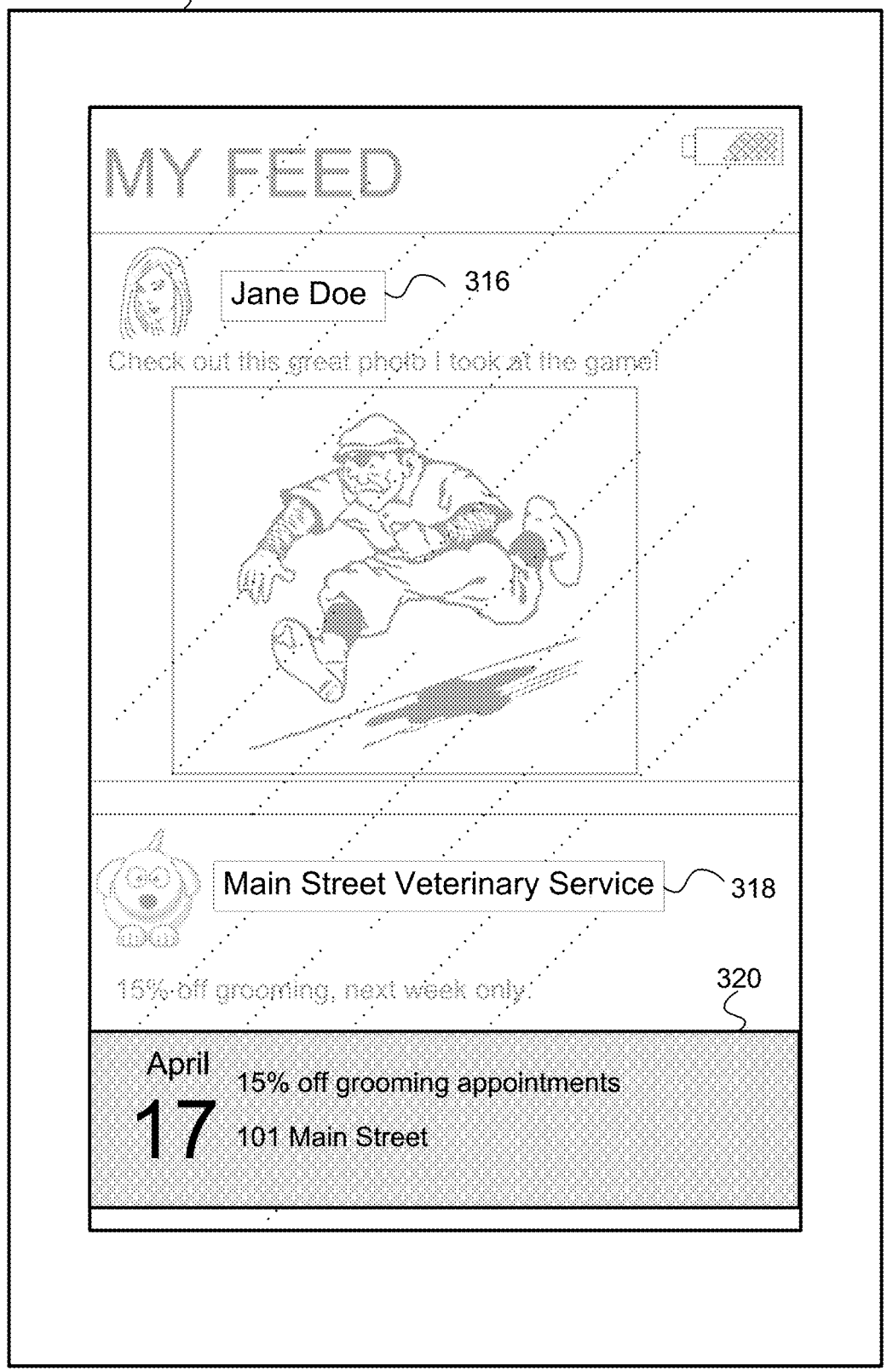

For example, as shown in FIG. 3C, three objects are recognized by the AR system and are thus visually called out for the user while the overlay is in place. The first object 316, is the name "Jane Doe." The second object 318 is the name "Main Street Veterinary Service." The third object 320 is the April 17 appointment for 15% off a grooming appointment at 101 Main Street. Depending on the configuration of the AR system, various supplemental content/potential functions may be presented to the user as a result of these recognized objects. For example, for object 316, the user may be presented with the option of creating a contact for Jane Doe, calling Jane Doe (if she already exists in the user's contacts), sending a text message to Jane Doe, etc. For object 318 the system may present the user with the option of creating a contact for the business, calling the business (for example based on a telephone number found in a public directory), identifying reviews of the business, etc. For object 320 the system may present the user with the option of creating a calendar appointment, getting directions to the address, etc. The various supplemental content/potential functions may be displayed to the user in a number of ways, including only visually presenting themselves when the user selects the respective object, for example by touching the object.

The overlay provides several benefits in terms of the user experience. The appearance of the overlay itself indicates to the user that the command to enter the recognition mode has been received and processed. It also serves the purpose of "freezing" the underlying application(s) or processes to prevent the user from interacting with them while in recognition mode. The overlay also provides a desirable way of indicating to the user what objects have been recognized (for example by viewing them through a window), without removing those objects from the context of the underlying display or altering their appearance too drastically. Finally, the animation of the overlay also gives the system time to perform AR processing, such as capturing the data, sending the data to a remote device (if desired), processing the data, identifying supplemental content, etc. In this way any delays from AR functions may be masked from the user.

The system may also be configured to receive an indication from the user as to objects or items the user is interested in. The user may make notes regarding those items and the system may track the notes and items so that when the user encounters those items in a later context, the user may be presented with the note (or other information).

To receive a user note regarding an item displayed on the screen, the device may enter a "notebook" mode, where it can accept input from the user to designate certain objects and receive user generated content regarding the objects. For purposes of illustration, the notebook mode may initiate similarly to the recognition mode, including being initiated by a user action (which may be any of the user actions discussed above for recognition mode or may be a different action). The notebook mode may also be accompanied by a visual indicator, for example the overlay 306 as illustrated in FIGS. 3B and 3C. As above with the recognition mode, the overlay allows the notebook mode to display the underlying content to the user, while "freezing" that content while the mode is active. In certain system configurations, the notebook mode and recognition mode may activate simultaneously, allowing the user to both receive indications of recognized objects and supplemental content and to enter notes regarding objects that are of interest to the user.

Objects may be selected, and notes may be entered by the user in a variety of ways. The user may use a touch screen command to touch or circle a displayed object. The user may do so using his/her finger, a stylus, or other implement. The user may use a gesture, that may be detected by one or more cameras of the device to direct the user interface to select the object desired by the user. In another example, if the device is configured with speech controls, the user may speak a command to create a note regarding an object shown on the screen. The speech control may be paired with certain recognition processes happening before the user speaks the note command, thus allowing the system to more easily determine what displayed objects the user is referring to. Thus the device may receive an indication from the user of selection of a displayed object. Data that was sent to the display, and/or data that was sent to the recognition system, that includes the selected object, may be stored as metadata or in some other manner and associated with the selected object.

Once the desired object is selected, the user may optionally enter a note or associate other user-generated content with the selected object. For example, upon selection of the object, a window may appear allowing the user to paste text, a link, or other information in the window. The device may also allow the user to also speak an audio note or create a video in response to the user selecting the object. The user may also draw onto the touch screen a note, the text of which may be interpreted by the device and associated with the selected object. Examples of user-generated content may also include ebook text, email text, a web page address/link, a calendar item, videos (for example embedded or on a different screen), a photograph or image, social network content, etc. Other forms of user-generated content are also possible.

In response to the user selecting the object, data regarding the object and to the user's selection of the object (referred to as user selection data) may be stored. A new data structure may be created to store the user selection data, or the user selection data may be stored in an existing structure. The data structure may be a digital entity as described below. The user selection data may include a variety of different information. The user selection data may include an identifier of the user that selected the device (for example a unique ID associated with the user). The user selection data may also include an identifier of the object, which may include a semantic identifier, some portion of the text of the object, or other identifier. The identifier of the object may be one that is recognized by the augmented reality system so that objects selected by the user may also be cross-referenced with the augmented reality system to provide the user with additional information about selected objects, such as system identified supplemental content and/or potential user-selectable functions. To identify the selected object (and/or to obtain data to populate the user selection data, for example to determine an identifier associated with the selected object in the AR system), the system may use data associated with a display of the device (or images displayed thereon) even if though the data itself may not necessarily be image data. (For example, the data may be text data or other data that is used to generate images on the display.) For example, this data may be processed by the AR system to determine a named entity associated with the selected object. The named entity or an identifier thereof may be included in the user selection data. The user selection data may include any additional content related to the object submitted by the user (for example a text note, audio note, video note, attachment, link, etc.) or the additional user submitted content may be stored elsewhere and the user selection data may include a link to that additional user submitted content.

The user selection data may include information regarding the context in which the user selected the object. Such information may be considered context data. Generally, the context of the user selection may be considered the situation in which the user was operating the device when the user selected the object. Context data may include data regarding what device the user was operating when the object was selected (for example, a specific device identifier or device model information), what application the user was using, information about how the application was being operated (for example, what website the user was viewing in a web browsing application), what time the time the user selected the object, the location of the device (or user) when the user selected the object, a screenshot (such as a capture of all or some of the image on the device screen when the user selected the object) of the device display when the user selected the object, or other information.

The user selection data may also include tags related to the user selected object that describe aspects of the object. For example, if the user viewed an article on river rafting tours near Denver, Colorado and selected the name of a particular tour operator, the user selection data associated with the selected tour operator may have tags such as "vacation," "Denver," "recreation," etc. The device may receive a selection of a tags from a user (for example the system may prompt the user to select tags when selecting an object) or may be selected by the system based on certain knowledge about the selected object. For example, the AR system may be configured to associate tags with certain objects (and insert those tags into user selection data) based on knowledge of the object and/or the user. The user selected data may also include indicators for later actions such as "add to vacation list," "read later," or any number of configurable actions.

The user selection data associated with each object selected by the user may be stored and associated with the user (for example by using an identifier associated with the user). Such data may be stored locally on the user's device and/or may be sent to a remote server that tracks user selection data. Each time the user begins to operate a new device, user selection data associated with the user (which may include all user selection data or only certain user selection data) may be sent to the new device using an identifier associated with the user. For example, when the user begins to operate a different device, that device may be associated with the user. That association may occur prior to the actual operation of the device (for example when the device is first purchased or configured), may occur in the context of an operation session (for example, when the user picks up the device to operate it), or may occur in another way. In one example, the user may log in when operating a device. In another example, the device (or remote server, etc.) may determine the user based on operation of the device (for example, accessing certain email accounts, operating certain applications, or other behaviors that match a specific user pattern) as device operation may serve as a better identifier of the user than login information in certain cases. Additional information may also be used to associate the user with the device and/or interaction, such as GPS data associated with the interaction being associated with the user (i.e., known home, work, or other location), image recognition of the user's face while operating the device, etc. The user identified as the operator of the device may be associated with objects recognized by the device while being operated by the user. With the new device associated by the user, the remote server may send the device the user selection data associated with the user. The new device may also report to the server any further interactions with previously selected objects (and associated data regarding those interactions). The server (or other device) may then track each user encounter with a selected object and distribute data regarding those encounters among devices associated with the user. In this manner objects selected by a user may be tracked and synchronized across devices.

When the user operates a device (be it a new device or the same device with which the user selected the object) the device (or a remote server) may compare data that is based on data to be output on the display of the device with previously stored user selection data. The data used for comparison (that is the data based on data to be output on the display) may include actual image data or may include other data such as features, summarizations, or other data corresponding to or based on the data to be output. The comparison may reveal when the user again encounters an object that he/she previously selected. The data to be output on the display may include display data that appears on the screen, for example image data the system may process to recognize objects. Or the data to be output on the display may include data captured at a different level of the device, for example data from one or more applications operating on the device. This data may be the same or different from the kinds of data used when the user selects objects, described above. This data may also be associated with a display of the device (or images displayed thereon) even if though the data itself may not necessarily be image data. (For example, the data may be text data or other data that is used to generate images on the display.) Prior to the comparison the system may perform object recognition on the data to be output on the display of the device. Any recognized objects may be compared with objects indicated in the user selection data, for example by comparing semantic identifiers of objects recognized on the display and semantic identifiers of objects in the user selection data. If any objects match, the system may determine that an object displayed on the device corresponds to an object previously selected by the user and may notify the user accordingly, as described below. In this manner the system may constantly run a filter or other operation to determine if objects that were previously selected by a user in one context are being displayed to the user in another context.

In addition to notifying the user if an object being displayed is identical to a previously selected object, the system may notify the user if an object being displayed is similar, or related to, a previously selected object but may not be exactly the same. Using the concept of nearness (such as semantic nearness, geographic nearness, temporal nearness, social nearness, etc.), the system may determine that an object being displayed is near to, or related to, a previously selected object. That determination may be made using various factors such as tags, other information associated among objects as known to the AR system, information related to the user, etc. For example, if a user has previously selected a river rafting tour operator in Denver, and an object is detected on the display regarding airfares to Denver, the system may identify the object related to the airfares as related to the previously selected object and may indicate the presence of that related object to the user. Other such relational examples are also possible.

The system may indicate to the user the presence of a previously selected object (or object related to a previously selected object) on the display in a number of ways. The system may visually indicate the presence of the object to the user. This may include, for example, highlighting the object in some way (for example, using the graphical elements described above), contrasting the object from its surroundings (for example, by raising the object in a simulated depth on the display), or otherwise visually calling out the object from the display. The indicator may be created by the application displaying the object (for example a map application showing a previously selected restaurant) or the indicator may be invisible to the application and added at a higher layer (for example by the operating system of the device). To perform application level indications, individual applications may be allowed access to user selection data and/or object recognition results. The indicator may also include a general indicator, such as an LED light that goes on or some user interface (UI) element that appears (for example, an exclamation mark in a corner of the display) that indicates to the user that an object is recognized, without necessarily calling out what the object is. The user may follow up on that indication as configured in the UI to learn more about the object that is recognized. The indicator may also take the form of an audio indicator (such as a general beep or spoken message identifying the object), a haptic indicator (i.e., a vibration by the device or an attached wearable), or some other indicator.

If the user desires to learn more about the previously selected object that now is recognized by the device, the user may indicate that desire to the device. This may include selecting the object on the screen, activating another mode of the device (for example the overlay mode discussed above) or some other operation. The device may then present the user with information about the object, such as any user generated content regarding the object (for example, a previous note made by the user about the object, a link selected by the user to associate with the content, or the like), information regarding previous encounters with the object (for example, context information about when the user encountered the object before), further information about the object (for example, supplemental content or user-selectable functions as determined by the AR system), etc.

Figure 3D:
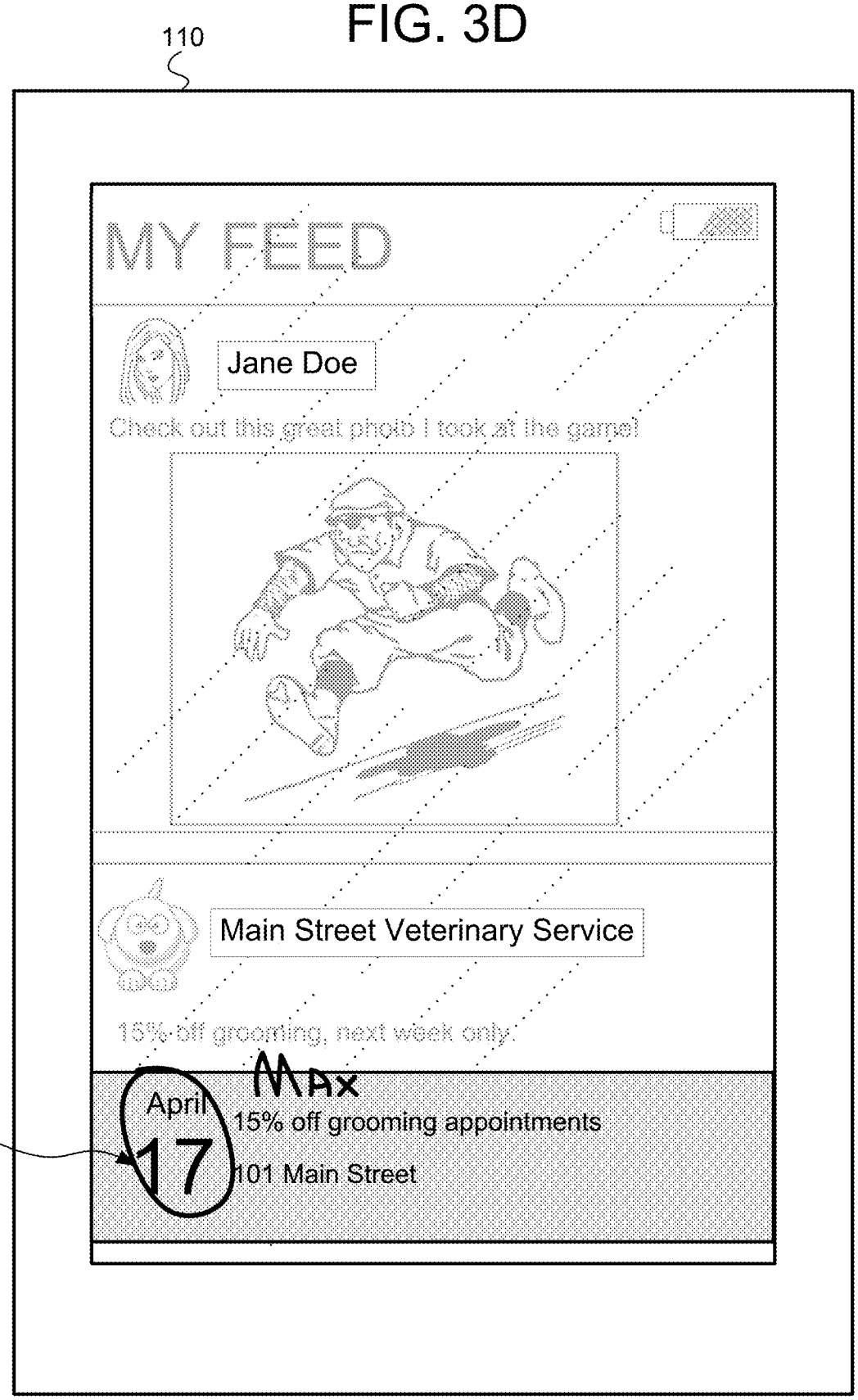

An example of a system receiving a selection of an object in one context and then retrieving information about the object in another context may be illustrated using the Figures. For example, a user may operate a mobile device 110 to run a social media application such as the one shown in FIG. 3A during a first session. The device may then activate a mode in which the user may select objects for future reference, for example the overlay mode shown in FIG. 3B. The overlay mode may optionally show objects that are recognized by the AR system, as illustrated in FIG. 3C. (In other configurations, the objects may be selected without previous recognition by the AR system.) The device may receive an indication of selection of the displayed objects. As shown in FIG. 3D, the user may circle the date April 17 in the veterinary services offer 312. The user may also add content to be associated with the object, such as the user's note "Max." The device receives the indication to select the object (the circling of the date) as well as the additional content (the user's note). The device 110, either on its own or in communication with a remote server 140, may then create a data structure including (or add to an existing data structure) user selection data including information about the object 320, such as an object identifier, information about the user (such as the user identifier), information about the user's note (such as the text "Max"), information about the context in which the user saw the object (for example an identifier of the mobile device 110, the application "My Feed", a screenshot of portions of the display shown on FIG. 3D, a record of the time, etc.), and/or other information. The data structure containing the user selection data may then be sent to the remote server 140 for distribution to other devices associated with the user.

At a later session the user may operate a home computer. The home computer may interact with the server 140 (or with a different server connected to the system) to obtain the data structure described in reference to FIG. 3D. The home computer may obtain that data structure ahead of time, or when the user logs in to the home computer for the particular session being illustrated. As the home computer operates, it may obtain data from underlying applications, or from different layers, that is to be used to render images on the display that will be seen by the user on the home computer.

The home computer, on its own or in combination with one or more servers, may then process that data to determine if any objects in the received user selection data are found in the data to be used to render the display of the home computer. The home computer/server(s) may also determine if any objects that are about to be displayed are related to objects in the received user selection data. If an object is to be displayed that matches/is associated with an object in the user selection data, the home computer will indicate that to the user. For example, as shown in FIG. 3E, if the user operates home computer 110g during a later session to view a calendar for April, the home computer may display an indicator over the date April 17. In FIG. 3E, the indicator is shown as a circle around April 17. If the home computer receives a command to view information related to the indicator (for example by clicking on the date), the home computer may display the object originally selected by the user, and other related information (such as the user's note "Max"), as shown in FIG. 3F. The information for the display of FIG. 3F may be taken from the data structure sent to the home computer including the user created/selected data or may be retrieved by the home computer 110g from a server in response to the user selecting more information from the screen shown in FIG. 3E. The display of FIG. 3F may display the user created data in a number of ways, including replicating the display that the user previously encountered when creating the user created data (for example, as a way to prompt recall by the user), incorporating the previous displayed content with the user created content. In addition to the information shown in FIG. 3F, the home computer may also display supplemental content or potential user-selectable functions (for example, a calendaring function) as determined by the AR system.

As illustrated above, a system may display information about previously selected objects when those objects are again encountered in a later context. In one aspect, the system may also keep track of all selected objects that may then be reviewed by a user in a summary form, such as in a list of previously selected objects. Thus, a user need not wait until a selected object is encountered again, he/she may simply access a reference page constructed and displayed by the system that shows selected objects and/or the user generated content associated with those objects. The reference page may also include access to other information, such as information related to the objects determined by the AR system, screenshots of/context information related to where the user encountered a selected object (either when the object was first selected or when the user encountered the object in a different context), tags related to the objects, information showing which of the user's acquaintances selected the same or related objects, etc. This reference page may be compiled by reference multiple sets of user selection data as tracked by the system (either on a specific device or by a remote server). The reference page may be sorted/presented to the user in any number of configurable ways.

Figure 3G:
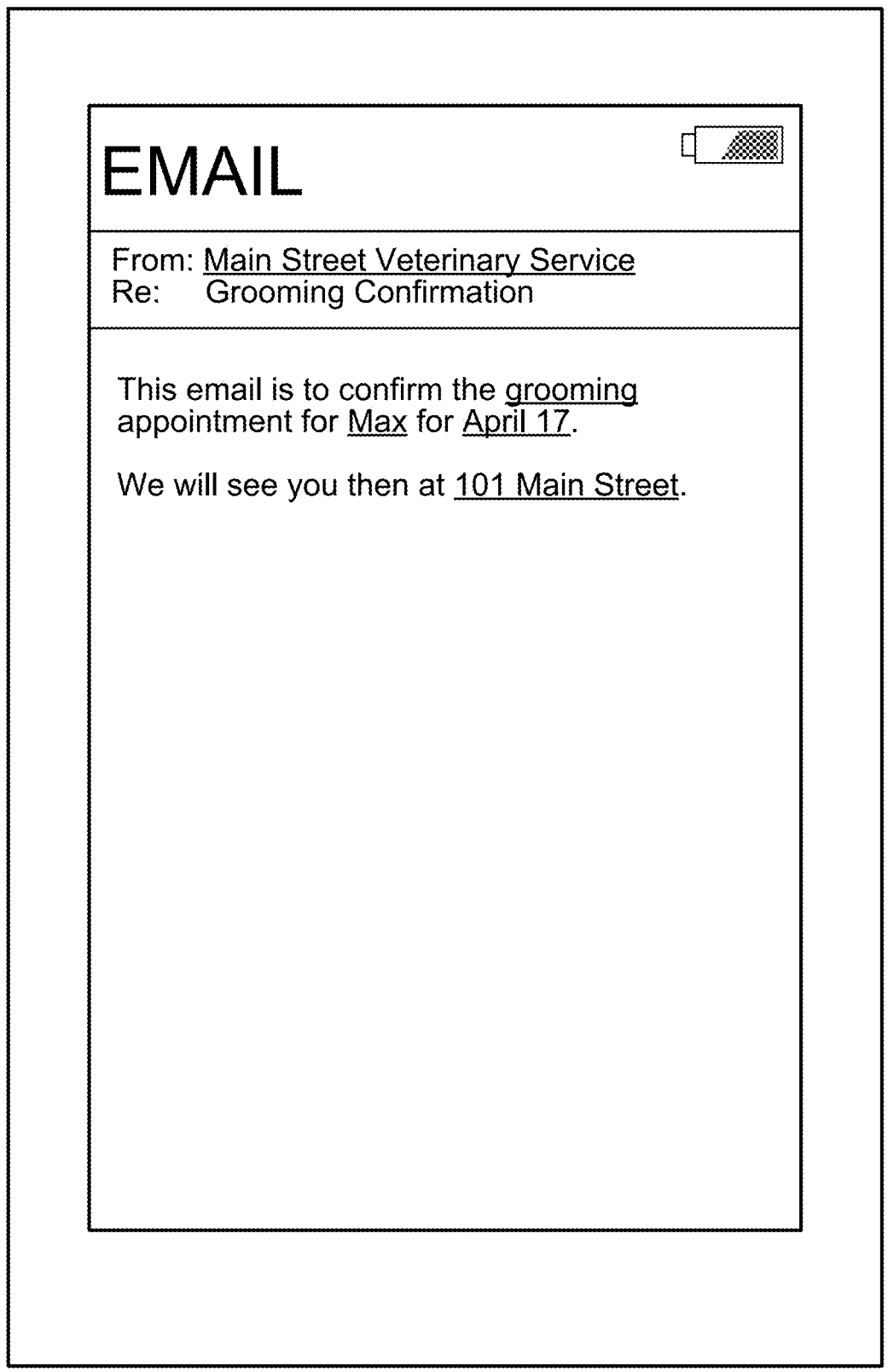

In another aspect, other information related to the selected objects may be displayed to the user when the user activates an AR view mode, for example the overlay mode illustrated in FIGS. 3B-3D. Continuing with the example discussed above, FIG. 3G illustrates the user receiving a confirmation email (during an even later session) for the grooming appointment from the veterinary service. FIG. 3G may illustrate the same device that was operating when the appointment was made (for example the same device 110 of the session illustrated FIG. 3D), or a different device that recognized the user and is configuring its operation for the user during the session of FIG. 3G. Prior to displaying what is illustrated in FIG. 3G, the device of FIG. 3G may have compared the incoming data (for example the text of the email) to stored data and associates with the user or with other supplemental content/functions. The device of FIG. 3G then indicates the availability of additional content to the user by underlining text associated with additional content. To access the additional content the user may activate the overlay mode, for example by pushing a button, activating a gesture, etc.

Figure 3H:
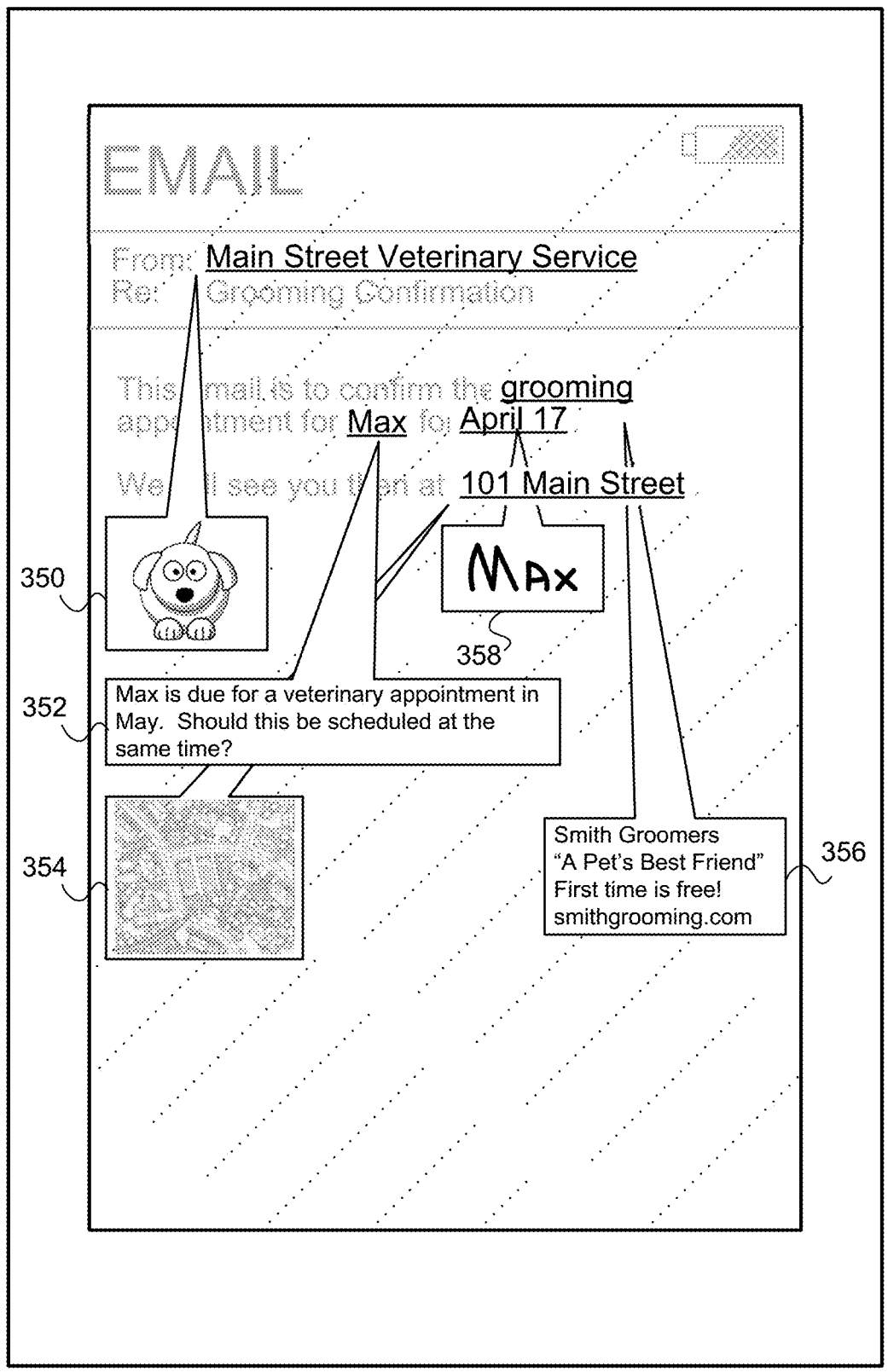

FIG. 3H illustrates an example of the device in FIG. 3G in overlay mode. Although the supplemental content is displayed to the user in a particular fashion, the actual display of supplemental content may vary and is configurable based on desired device operation. As shown in FIG. 3H, various items of supplemental content may be displayed to the user. Item 350 is a logo associated with the veterinary service that has sent the confirmation. Prior to the display of FIG. 3G, the system may have determined that additional information was available regarding the particular veterinary service based on its name, previous interactions with the service by the user, etc. When the user indicates to access the supplemental content, for example by initiating the mode shown in FIG. 3H, the supplemental content (in this case the logo) is shown. Additional supplemental content (such as a reminder for the appointment, etc.) may also be shown, however for purposes of illustration item 350 is shown regarding the veterinary service.

Item 352 is a reminder for a pending medical treatment for the dog "Max." Prior to the display of FIG. 3G, the system may have determined that additional information was available regarding the dog based on the dog's name, the overall context of the email, recent previous activity by the user regarding the dog, the dog's medical history available to the system, or the like. The system may recognize a communication with the veterinary service and may remind the user of the scheduled treatment to prompt the user to potentially schedule the treatment during the grooming appointment.

Item 354 is a map showing the address "101 Main Street" included in the email. Prior to the display of FIG. 3G, the system may have recognized the text as an address with an associated map. Activation of the overlay mode led the system to display the additional information, in this case the map, of item 354.

Item 356 is information regarding another groomer in the user's area. Prior to the display of FIG. 3G, the system may have determined that additional information was available based on the word "grooming." Activation of the overlay mode led the system to display the additional information, in this case the information about the additional groomer, of item 356.

Item 358 is the note created by the user as explained above in reference to FIG. 3D. When the note was created, the system associated the note with the date "April 17." When the date was included in the email, the system recognized the date and indicated to the user that additional information was available regarding the date (for example by underlining the date in FIG. 3G). Activation of the overlay mode led the system to display the additional information, in this case the note, of item 358.

One or more of the items 350-358 may be selectable by the user, which may cause the system to display even further information about the underlying object in question, for example by providing additional information in the overlay mode or entering another mode whether the user can access the information. For example, selecting the map 354 may launch a map application, selecting item 356 may take the user to the website of "Smith Groomers", etc.

Depending on system configuration and user settings, objects selected by one user may be referenced by another user (for example friends, family, coworkers, etc.). In this manner, objects previously viewed by one user may trigger a notification by the system when related objects are viewed by another user. The system may determine whether the two objects are "related to" each other using concepts of social nearness of the users, where users that are closely aligned in the system may more easily trigger cross-notifications of each other's selected objects than users that are considered farther apart by the system.

The system described herein may thus be used to allow users to select objects in one context, and identify to the user when the same or related objects are encountered by the user in a different context. Context here includes different interactions between a user and a device. The creation of data related to user selected objects, and later reference to that data, allows recognition of user-selected objects across context. For example, a user operating a first application on one device and then a different application on the same device may be considered a different context. A user operating a first application on one device and then a second application on a different device may also be considered a different context.

The system may make use of various components and structures described below.

Figure 4:
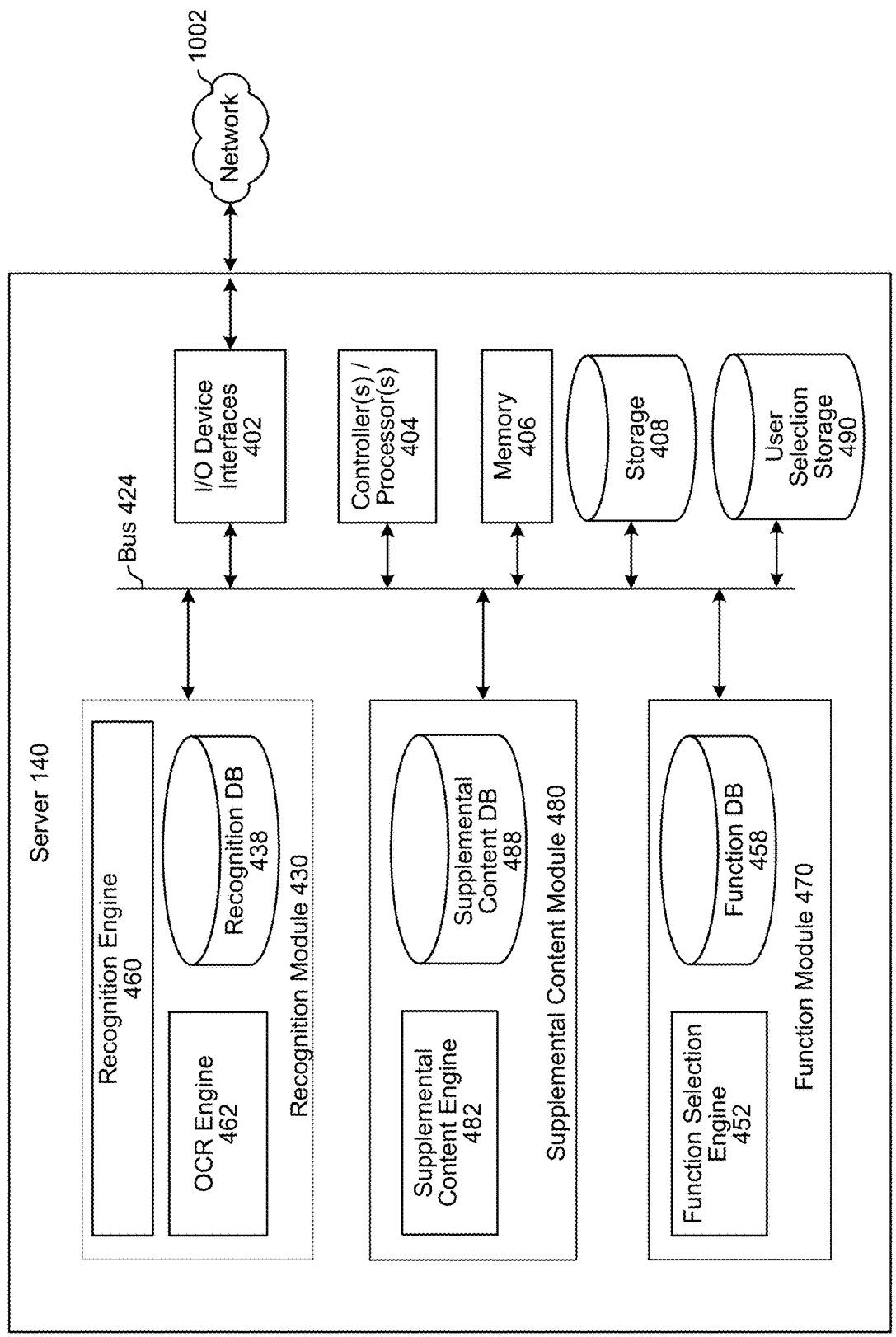
FIG. 4 is a block diagram conceptually illustrating example components of a server according to one aspect of the present disclosure.
Figure 5:
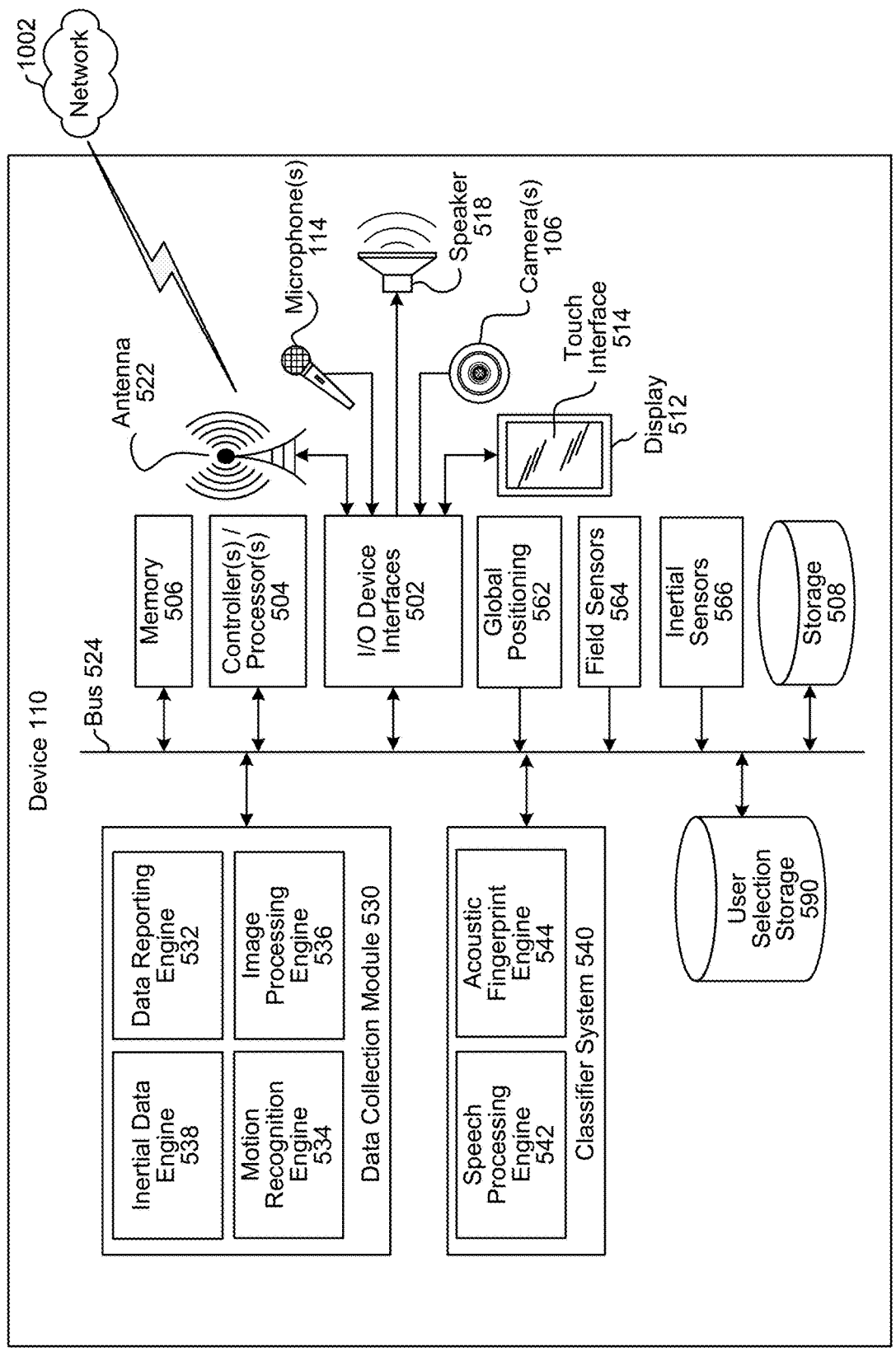
FIG. 5 is a block diagram conceptually illustrating example components of a mobile device according to one aspect of the present disclosure.

FIGS. 4 and 5 illustrate block diagrams conceptually illustrating components of the system 100. Depending upon how the system 100 is structured, some of components shown in FIG. 4 as part of server 140 may include included in the mobile device 110, and some of the components shown in FIG. 5 as part of mobile device 110 may be included in the server 140. In operation, the system 100 may include computer-readable and computer-executable instructions that reside in storage 408/508 on the mobile device 110 or server 140. Mobile device 110 and server 140 may be any computing devices, or a collection of computing devices, and are referred to herein as "mobile device" and "server" to facilitate understanding based upon an example system architecture. Other arrangements are possible, such as device 110 being one-or-more fixed (non-mobile) terminals.

Each of the mobile device 110 and the server 140 may include one or more controllers/processors 404/504 comprising one-or-more central processing units (CPUs) for processing data and computer-readable instructions, and a memory 406/506 for storing data and instructions. The memory 406/506 may include volatile random access memory (RAM), non-volatile read only memory (ROM), non-volatile magnetoresistive (MRAM) and/or other types of memory. The mobile device 110 and the server 140 may also include a data storage component 408/508 for storing data and processor-executable instructions. The data storage component 408/508 may include one or more non-volatile storage types such as magnetic storage, optical storage, solid-state storage, etc. The mobile device 110 and server 140 may also be connected to a removable or external non-volatile memory and/or storage (such as a removable memory card, memory key drive, networked storage, etc.) through the input/output device interfaces 402/502.

Executable instructions for operating the device 110, the server 140, and their various components may be executed by the controller(s)/processor(s) 404/504, using the memory 406/506 as temporary "working" storage at runtime. The executable instructions may be stored in a non-transitory manner in non-volatile memory 406/506, storage 408/508, or an external device. Alternatively, some or all of the executable instructions may be embedded in hardware or firmware in addition to or instead of software.

Referring to FIG. 4, the server 140 is connected to a network 1002 via input/output device interfaces 402. The input/output device interfaces 402 may also include an interface for an external peripheral device connection such as universal serial bus (USB), FireWire, Thunderbolt or other connection protocol. The input/output device interfaces 402 may connect to one or more networks 1002 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The server 140 may include an address/data bus 424 for conveying data among components of the server 140. Each component within the server 140 may also be directly connected to other components in addition to (or instead of) being connected to other components across the bus 424.

The server 140 may further include a recognition module 430 that performs recognition on content captured by or available to the mobile device 110, such as the recognition operations discussed above. For example, the mobile device 110 may send image data (either raw or processed) to the server 140 for the server to perform recognition on the image data. The image data may include single still images, a video feed, or portions of still images or a video feed, such as isolated or processed portions thereof. The recognition module 430 may include a variety of components, including a recognition engine 460, OCR engine 462, recognition database 430, or other components such as an audio recognition module (not shown) or the like. The recognition database 468 may store data used by the various engines/processors of the recognition module 430 such as image data, audio data, OCR language models, OCR dictionaries, and the like. The recognition module 430 may communicate with the supplemental content module 480. The recognition module 430 may also communicate with user selection storage 490 that may store user selection data to be used by the recognition module when recognizing whether data to be displayed for a user includes objects that have previously been selected by the user (or related objects thereto).

The supplemental content module 480 may identify supplemental content related to objects recognized by the recognition module 430. Such supplemental content may include other content or information related to objects recognized by the recognition module 430 where the supplemental content is not necessarily included in the specific content item in which the recognized object is found. For example, if a landmark is recognized in a video, supplemental content may include general information about the landmark, other images of the landmark, calendar entries of a user corresponding to visits to the city in which the landmark is located, social media content discussing the landmark or the landmark's location where the social media content is associated with the user (for example, posts by the user's friends or family), or the like. In another example, if a specific song is recognized in audio data, supplemental content may include the name of the composer of the song, a band name, an album title, other versions of the song, a list of social media contacts who have the song in their music collections, concert dates for the band, etc. The supplemental content engine 482 may cross reference an identified object with one or more information sources, including a supplemental content database 488, which may include database entries tracking certain potential recognized objects or object classes (e.g., person, place, song, product, etc.) and their corresponding supplemental content or potential supplemental content types. Given the vast amount of information that may qualify as supplemental content, the supplemental content module 480 may communication with a multitude of other information sources including those located remotely from the server 140. For example, the supplemental content module 480 may communicate with Internet sources, retailers, library catalogs, etc. to identify supplemental content. The supplemental content module 480 may also communicate with user selection storage 490, for example to identify any user designated content to be associated with a user selected object, such as a written note, audio note, link, etc. Supplemental content may include a wide variety of content such as additional facts related to portions of the content, user notes on the content, friend's notes on the content, critic notes on the content, news articles related to the content, etc. Once supplemental content related to a recognized object is identified, it may be sent to the mobile device 110.

In addition to supplemental content, the recognition system may determine one or more potential user-selectable function based on recognized objects. The-user selectable function causes the system (upon selection by the user) to perform some action based on the particular recognized object. Such potential user-selectable functions may be presented to the user on the mobile device, for example using the ribbons discussed above. The function module 470 operates to select one or more functions to present to a user, for example in ribbons 244, 264, or 282. The functions may be based on objects recognized in a content item stored on or otherwise accessible to the mobile device 110. Selection of one of the functions by the user leads to execution of the function by the mobile device 110, server 140, or other device. Accordingly, the function module 470 may communicate with one or more other components such as application modules of the mobile device 110, other servers, etc. For example, if a function module 470 determines that based on recognition of a telephone number by recognition module 430, the user should be presented with options to dial a telephone number or add the number to a contact, the function module 470 may send a command to a telephone application of a mobile device 110 if the user selects the function to make a call, or the function module 470 may send a command to a contact module (located either at the mobile device 110 or elsewhere) if the user selects the function to add to a contact. The function module 470 may communicate with the supplemental content module 480 to offer the user different functions based on identified supplemental content. The function module 470 may also communicate with the user selection storage 490 to identify, if applicable, any functions indicated by the user to associate with any user selected objects. The function module may include components such as a function selection engine 452 which analyzes the recognition and supplemental content data to select one or more functions to offer to a user and their relative priority and a function database 458 which stores information used by the function selection engine 452. Although multiple storage entities are illustrated, the various storage/databases 458, 468, 488, 490, and/or 408 may be combined in various configurations.

Referring to FIG. 5, the system 100 may include a variety of sensors such as those illustrated with device 110, which may be a mobile device or non-mobile device (such as a desktop computer). For present illustration purposes, device 110 of FIG. 5 may be discussed as a mobile device. Among the sensors are an audio capture component such as microphone(s) 114, an image and/or video capture component such as camera(s) 106, a touch interface 514, an antenna 522, global positioning sensors 562, field sensors 564 (e.g., a 3-axis magnetometer, a gravity sensor), and inertial sensors 566 (e.g., a 3-axis accelerometer, a 3-axis gyroscope). The mobile device 110 may also include one or more buttons 202 (not shown). Several of each of these components may be included. Also, although shown as integrated within device 110, some or parts of the various sensors may be external to device 110 and accessed through input/output device interfaces 502.

The antenna 522 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 114 or array of microphones, a wired headset (not illustrated), a wireless headset (e.g., wireless headset 1021 in FIG. 10), etc. If an array of microphones is included, approximate distance to a sound's point of origin may be performed acoustic localization based on time and amplitude differences between sounds captured by different microphones of the array.

The touch interface 514 may be integrated with a surface of a display 512 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The global positioning module 562 provides an interface for acquiring location information, such as information from satellite geographic positioning system(s). For example, the global positioning module 562 may include a Global Positioning System (GPS) receiver and/or a Global Navigation Satellite System (GLONASS) receiver. The global positioning module 562 may also acquire location-based information using other radio sources (e.g., via antenna 522), such as mapping services that triangulate off of known WiFi service set identifiers (SSIDs) or cellular towers within range of the device 110.

The field sensor module 564 provides directional data. The field sensor module 564 may include a 3-axis magnetometer that measures magnetic fields and may serve as a compass. The field sensor module 564 may also include a dedicated gravity sensor to determine up-and-down.

The inertial sensor module 566 provides inertial data, and may include 3-axis accelerometer and a 3-axis gyroscope.

Examples of other sensors include an electronic thermometer to measure ambient temperature and a proximity sensor to detect whether there is an object within a certain distance of the mobile device 110.

Sensors may be communicatively coupled with other components of system 100 via input/output (I/O) device interfaces 502 and/or via an address/data bus 524. The address/data bus 524 conveys data among components of the mobile device 110. Each component within the mobile device 110 may also be directly connected to other components in addition to (or instead of) being connected to other components across the bus 524.

The I/O device interfaces 502 may connect to a variety of components and networks. Among other things, the I/O device interfaces 502 may include an interface for an external peripheral device connection such as universal serial bus (USB), FireWire, Thunderbolt or other connection protocol.

The input/output device interfaces 502 may also support a variety of networks via an Ethernet port and antenna 522.

The system 100 may also include a video output component for displaying images, such as display 512. The video output component may be a display of any suitable technology, such as a liquid crystal display, an organic light emitting diode display, electronic paper, an electrochromic display, a pico projector, etc. The video output component may be integrated into the mobile device 110 or may be separate.

The system 100 may also include an audio output component such as a speaker 518, a wired headset (not illustrated), or a wireless headset (e.g., wireless headset 1021). Other output devices include a haptic effect generator (not illustrated). The haptic effect generator may be of any haptics technology, including technologies to vibrate the entire device 110 (e.g., electromagnetic technologies such as vibratory motor or a coil with a central mass) and/or may comprise technologies allowing the haptic effect to be localized to a position of the touch interface 514, such as electroactive polymers, piezoelectrics, electrostatics, subsonic audio wave surface actuation, etc.

As discussed above, device 110 includes controller(s)/processors 504, memory 506, and storage 508. In addition, the mobile device may include a data collection module 530 and a classifier system 540, each of which may comprise processor-executable instructions stored in storage 508 to be executed by controller(s)/processor(s) 504 (e.g., software, firmware), hardware, or some combination thereof. For example, components of the data collection module 530 and the classifier system 540 may be part of a software application running in the foreground and/or background on the mobile device 110.

Figure 10:
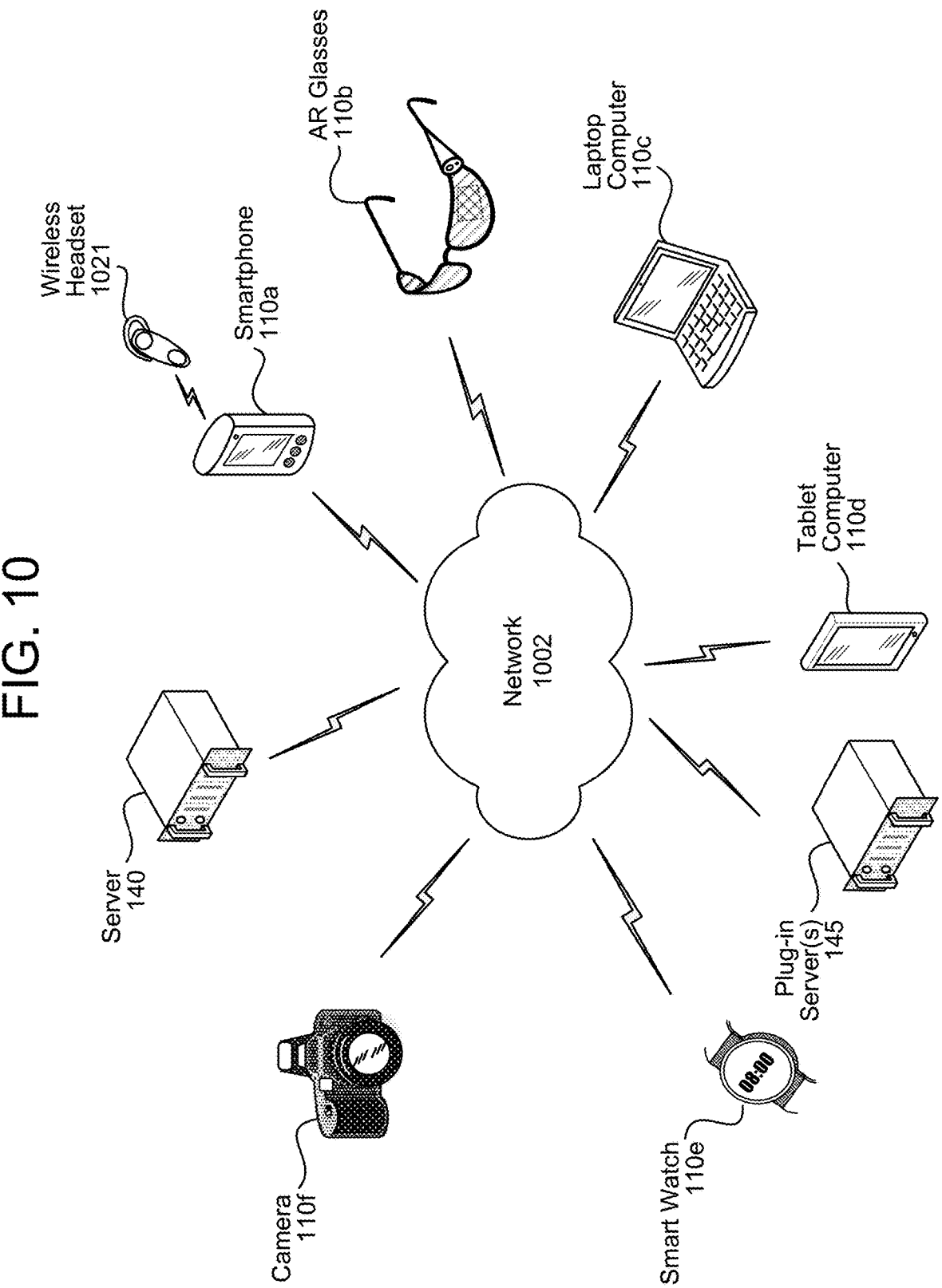
FIG. 10 illustrates an example of a computer network according to one aspect of the present disclosure.

The data collection module 530 gathers and processes sensor data for transmittal to the server 140 or other devices (such as a server dedicated to the plugin, shown as plugin server 145 in FIG. 10) for the determination of context and to support context-related processing on the mobile device 110 itself. The data collection module 530 may also be configured to collect data regarding user selected objects, such as user selection data, context data, or other data discussed above. Such data may then be stored in user selection storage 590, and/or transmitted to a remote device, such as server 140.

A data reporting engine 532 manages reporting to the server 140 and/or to plugin server 145. The degree of pre-processing of sensor data on mobile device 110 may depend upon how the system 100 is configured, such that the data reporting engine 532 may send varying degrees of raw and processed sensor data. Sensor data may be sent intermittently, at scheduled times, in response to a query from server 140, or based on preset thresholds or criteria, such as transmitting when changes on data from a sensor exceeds a threshold. While raw sensor data may be transmitted to server 140, processing of certain sensor data at the mobile device 110 may reduce the volume of data transmitted and provide user 10 a higher degree of privacy.

Data reporting engine 532 may also collect information about the device's surrounding from an image processing engine 536. The image processing engine 536 may perform image and/or text recognition such as the object recognition described above in FIGS. 2A-2D and 3C. The image to be processed may be captured by the camera(s) 106 or may be obtained in other ways, such as attached to an email, text message, or other data to be sent to a device for display, etc. The image processing engine may have functionality similar to the recognition engine 460. Further the data reporting engine 532 may incorporate components similar to those of the recognition module 430. In one aspect, the image processing engine 536 may take images from front and rear facing cameras (e.g., camera(s) 106) and perform head or face detection to determine if the display 512 is facing the user or away from the user. Head or face detection may also be used to determine if other people are detected. In addition, using the camera(s) 106 and/or the proximity detector, the image processing engine 536 may approximate a distance between a detected object and the device, such as by comparing a detected face with an average face size to approximate distance, calculating parallax across two or more cameras to determine distance, approximating distance based on optical diffraction, etc. The image processing engine 536 may communicate with user selection storage 590, which may include similar information to the user selection storage 490, only may be specific to users of the device 110. Thus the image processing engine 536 may be configured to determine when previously selected objects of a user are identified in data to be displayed on display 512.

In one example, the image processing engine 532 may perform a certain amount of processing of image data prior to sending to the server 140. For example, if a server 140 was configured for OCR processing of the image data, the image processing engine 532 may convert color image data to black and white image data to both assist with OCR processing and reduce the bandwidth consumed when sending image data to the server. The image processing engine 532 may also identify sections of image data including text and isolate those portions for sending to the server 140 to reduce bandwidth usage and/or speed OCR processing. Such pre-processing may be performed on live data being captured by one or more of the device sensors or on non-live data, such as content stored on the mobile device or accessed by the mobile device from a remote location (i.e. webpage, remote storage, streaming source, etc.)

Data reporting engine 532 may also collect information from a classifier system 540 to characterize sounds captured by the audio capture components. Although described below in reference to the mobile device 110, aspects of this described functionality may be performed by a server depending on overall system configuration. The classifier system 540 may perform both speech recognition and noise recognition on captured audio, using speech models and acoustic fingerprints stored in storage 508. The classifier system 540 may comprise, for example, a Support Vector Machine (SVM), although other machine learning techniques might be used instead of or to augment SVM. The classifier system may utilize Hidden Markov Models (HMMs), Gaussian Mixture Models (GMMs), Mel-Frequency Cepstrum Coefficients (MFCCs), etc. The speech recognition techniques and the acoustic fingerprints or models may utilize the same or similar pattern recognition techniques but with different models (e.g., speech recognition may use phoneme models whereas noise recognition may use acoustic fingerprints) or may use different techniques altogether.

The speech processing engine 542 of the classifier system 540 may perform speech recognition and natural language processing. The speech processing engine 542 of the classifier system 540 may transcribe audio data into text data representing the words of utterances contained in the captured audio data. This text data may then be used by other components on the mobile device 110 or server 140 for various purposes.

The speech processing engine 542 interprets the captured utterance based on the similarity between the utterance and models "known" to the speech processing engine 542. The speech processing engine 542 may, for example, compare the input audio data with models for sounds (e.g., speech units or phonemes) and sequences of sounds to identify words that match the sequence of sounds spoken in the utterance of the audio data. The speech processing engine 542 may output the most likely words recognized in the audio data. The speech processing engine 542 may also output multiple alternative recognized words in the form of a lattice or an N-best list.

An acoustic fingerprint engine 544 may compare captured audio with fingerprints stored in storage 508 to determine whether captured ambient noise corresponds to a specified pattern. Examples include rain, a cacophony of voices, and tire/road noise.

The classifier system 540 may also provide information quantifying detected sound levels, how many different speakers can be distinguished, and acoustic localization information characterizing a distance to a source of an utterance or sound.

Data reporting engine 532 may also collect information from an inertial data engine 538 that processes data from the global positioning sensors 562, field sensors 564, and inertial sensors 566 to calculate a speed and direction of device motion, altitude, and device attitude.

The data reporting engine 532 may selectively report this information to the server 140 in accordance with privacy settings. For example, the data reporting engine 532 may report that speech is detected, a number of detected speakers, proximity information, ambient temperature, ambient light levels, ambient noise levels, whether ambient noise corresponds to a stored acoustic fingerprint, how many faces/heads are detected, whether the display 512 is facing a person, the type of motion, device location, direction of motion, altitude, attitude, speed of motion, and radio transmitters detected within range of antenna 522, while withholding information about the content of speech and images captured by camera 106.

As mentioned above, however, data reporting engine 532 may send raw data to server 140 for processing, such that one or more of motion recognition engine 534, image processing engine 536, inertial data engine 538, and classifier system 540 may be located at server 140 and be associated with controller(s)/processor(s) 404, memory 406, and storage 408. The data reporting engine 532 may collect and send stored content data to a server 140 or other system device.

Although not illustrated, the mobile device 110 may also include a function module, such as function module 470 configured to determine, select, and/or potentially execute potential user-selected functions based on recognized objects found in image data, such as that described in FIGS. 2A-2D and 3C illustrated above. Depending on system configuration the mobile device may also include recognition module 430 and/or supplemental content module 480 and may interact directly with the plugin servers 145 (for example through network 1002) without necessarily involving server 140.

To allow the system to recognize additional objects, and to provide additional supplemental content and/or functionality based on those additional objects (or based on objects already recognizable), the augmented reality system may be configured to be extendable through system plugins. Two primary plugins that may extend the system are external matchers and external resolvers. Matchers may assist the augmented reality system in identifying objects based on sensor data from a user device. A matcher extension may either take the sensor data from the augmented reality system and perform object recognition on its own, or it may provide the augmented reality system with object data the system may use on its own to recognize new objects or object classes. For example, a museum with an in-house art collection may provide the augmented reality system with a matcher including data necessary to recognize certain artworks when viewed by a computing device. Resolvers assist in expanding the augmented reality environment based on recognizable objects. A resolver extension may provide the augmented reality system with additional supplemental content and/or functionality that may be presented to a user upon recognition of an object. In the above example of the museum, the museum may provide the augmented reality system with resolver data allowing the user to, upon recognition of a particular artwork, to hear audio commentary regarding the artwork. In another example, a ticket seller may allow the augmented reality system to offer the user the ability to buy concert tickets upon recognition of a song by a band. Examples of implementations of such extensions are provided below.

Figure 6:
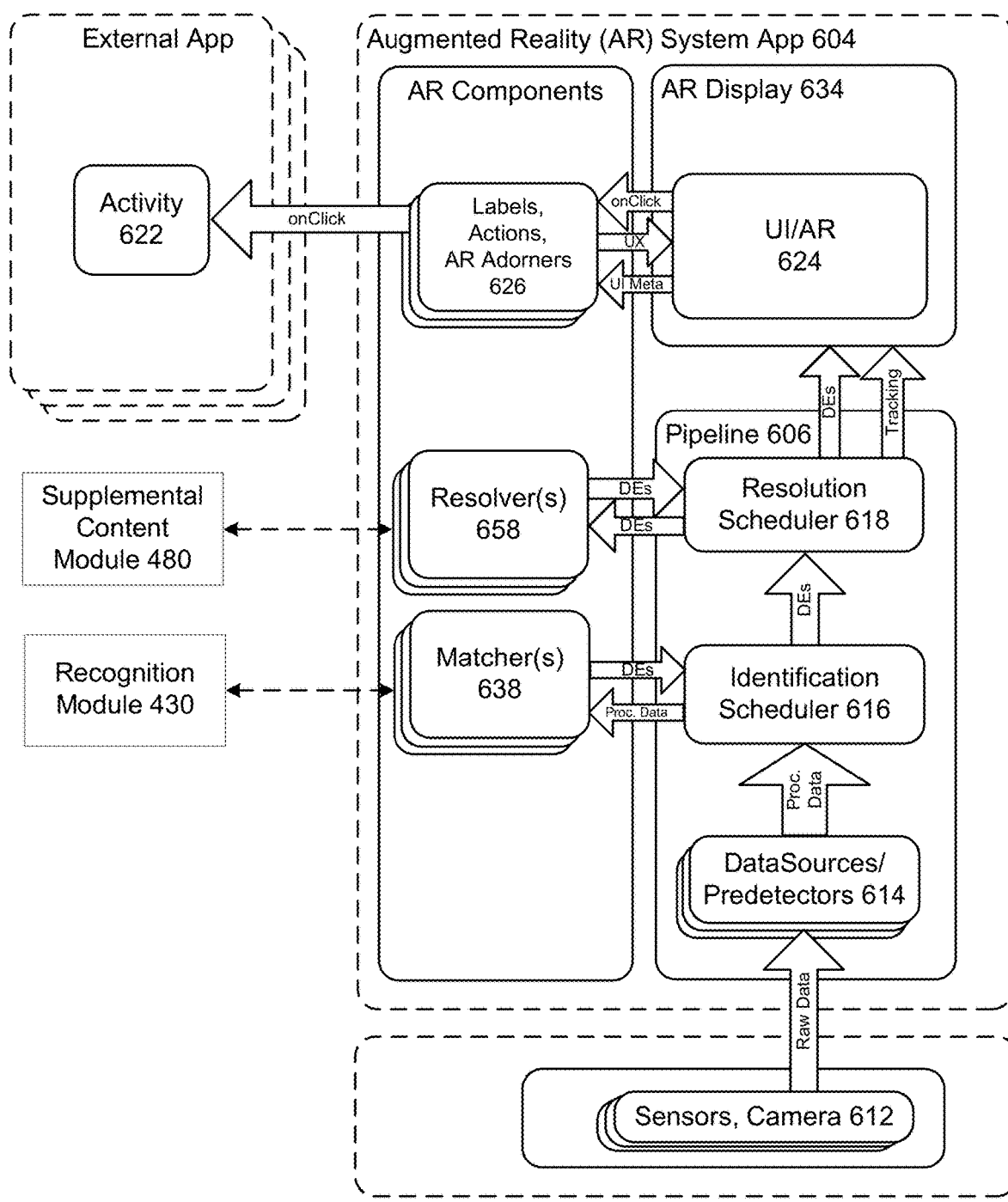
FIG. 6 is a block diagram conceptually illustrating operation of an augmented reality system according to one aspect of the present disclosure.

An example of the augmented reality recognition process is shown in FIG. 6. Data from sensors 612 of a user device is sent to the augmented reality system for processing in the pipeline 606. The processing of the augmented reality/recognition system as illustrated in FIG. 6 may be implemented as an AR/recognition application (App) 604, which may, for example, be an application package (APK) in certain Android configurations. The AR app 604 may run on the mobile device 110, on the server 140, or in some combination thereof. For example, the pipeline 606 may run on the mobile device 110 where the resolver(s) 658 and matcher(s) 638 may run on the server 140. The matcher(s) 638 may also communicate with a separate recognition module 430 that may be located on the same device as the matcher(s) 638 or on a remote device. Similarly, the resolver(s) 658 may also communicate with a separate supplemental content module 480 that may be located on the same device as the resolver(s) 658 or on a remote device. Various configurations of the AR system and processes are possible. When discussing the AR pipeline, components/software may be discussed as being "remote." In the AR pipeline components may be physically remote, as in running on a different physical device, or may be logically remote, as in running in a different component or process on the same physical device. Unless specifically stated otherwise, remote may refer to either configuration.

As shown in FIG. 6 and in subsequent figures, certain components are illustrated as potentially existing in as one of a plurality of components, as shown by multiple stacked boxes, for example, resolver(s) 658, matcher(s) 638, datasources/predetectors 614, sensors, camera 612, external APK, etc. While each component illustrated may be one of a number of similar components depending on system configuration, those illustrated with multiple stacked boxes may typically be configured as one of many potential similar components.

AR pipeline processing may be handled by the recognition module 430, such as by the recognition engine 460 and/or the OCR engine 462. The raw sensor data (such as an NV21 camera frame, audio PCM data, etc.) may come from any number of sensors such as those shown in FIG. 5 (562, 564, 566, 514, 518, 114, 522, 106) or other sensors. The raw data may include metadata (such as dimensions for a camera frame, timestamp, geo-location stamp, etc.) that may be used in the object recognition process. This raw data may be pre-processed or pre-detected (614) to isolate good sensor data for processing, for example by isolating a clear image with proper exposure, audio noise filtering, or by binarizing an image to assist with OCR processing. The processed data (Proc. Data) is then passed to the identification scheduler 616 which may invoke multiple identification processes in parallel. The identification processes may be heterogeneous, that is they may attempt to identify multiple unrelated items in parallel as the augmented reality system may not have any pre-information indicating the content of the sensor data. The identification scheduler 616 may reference matcher(s) 638, which may perform identification algorithms to match the sensor data to known objects (such as those stored in recognition database 438). The matcher(s) 638 may be located on the server 140 (for example as part of recognition module 430) or may be stored elsewhere and accessed by the identification scheduler 616, such as through a web service. As described below, specific kinds of sensor data may be sent to particular matcher(s) 638, including matcher plugins, based on the system and/or plugin configuration.

Upon recognition of an object, the matcher(s) 638 may return to the identification scheduler one or more digital entities that include data that describe the identified object in some form. A digital entity (DE) may include a root class representing a real world object (e.g., person, place, thing). The identification may be partial, as in may only identify a category of an object, rather than the specific object itself. For example, the matcher(s) 638 may recognize than an object is a UPC code, but not necessarily what specific UPC code the object is. Such partial identification data may be referred to as a facet. Each digital entity may be associated with various facet data. Each digital entity may become more robust (i.e., may have more facet data associated with it) as the augmented reality system continues its processing. A facet may include a type-label, an identification (ID) and/or attributes which include key/value pairs of string data for recognition purposes. For example, the type-label may be unique in a digital entity and may specify a type of the facet. The ID may be a unique ID within the facet type. For example, for a facet with a "book" type-label, the ID may be the ISBN. For a facet with a "phone number" type-label, the ID may be the actual phone number. The attributes may provide details of the facet, for example for a book, the author, title, publisher, edition, number of pages, synopsis, etc. Facets may include complex types and may be configurable based on the facet category. For example, a movie facet may have an attribute with a key called "contributors", which includes a serialized (e.g., JSON or XML) value with all of the actors, writers, producers and director. In this manner, a rich and strongly typed domain model can be presented through facets, but the underlying representation remains generic and extensible. The augmented reality system may include facets to handle recognition of a wide range of object types including (but not limited to) products such as music, books, movies, video games, or the like, songs, television programs, bar codes, QC codes, text (including actionable text such as email, URLs, phone numbers, regions of general text, and translations), locations and points-of-interest, brands, logos, people/faces, etc.

Plugins may add extend the system to add facets with information germane to the particular plugin. For example, a CD identified by the system may result in creation of a digital entity with a music facet. A concert plugin may then receive the digital entity and add facet data to the digital entity that contains information about upcoming concert for the artist (which may be limited to those in a geographic region of the user). A streaming music plugin may also receive the digital entity (in addition to or instead of the concert plugin) and add facet data to the digital entity about information on a recommended music channel based on the artist of the CD. A music video plugin may also receive the digital entity and add facet data containing information to enable the user to deep link to a music video from the album of the CD. Multiple plugins may thus operate on a single digital entity to add new facet data to the digital entity.

Digital entities sent from the matcher(s) 638 to the identification scheduler 616 may be sent to the resolution scheduler 618. The resolution scheduler 618 may invoke the resolver(s) 658 that add additional facets to the digital entity (for example, classifying the UPC as a code for a book and adding a book facet with complete details about the particular book). The additional facets added by the resolver(s) 658 may include supplemental content (such as the book details) or may indicate potential functions to be executed based on the object (such as presenting the user with an option to purchase the book). The resolver(s) 658 may include components and/or functionality of the supplemental content module 480 and/or the function module 470. The resolver(s) 658 may be located on the server 140 or may be located elsewhere. As described below, the resolution scheduler 618 may send certain objects or object types to specific resolver (s) 658, for example plugin resolvers, to perform special resolution depending on system/plugin configuration. Resolver assignment may depend on data included in the particular digital entity, for example, associating a particular resolver with a particular facet type-label (such as an object type) and sending that resolver digital entities that match the facet type-label (such as a resolver configured to resolve specific object types, e.g., wine bottle labels, etc.).

The populated digital entity (now including facets provided by the resolver(s) 658 or by a remote plugin), may be sent to the resolution scheduler 618 and to the augmented reality (AR) display layer 634. The resolution scheduler may also send tracking information to the AR display layer. The AR display layer may be located on mobile device 110. The AR display layer 634 may invoke the particular user interface (UI) components for the relevant identification type to retrieve UI/AR assets. For example, if a book is recognized, the AR display layer 634 may retrieve UI assets related to books for display to a user. The UI component 624 may generate a label, adorner or other UI/AR assets 626 and the AR display layer renders the assets using the corresponding object identification and/or other metadata. Such identifications may be stored in a historical database for retrieval at a later time, for example using the tracking information.

When a user interacts with the UI component (for example, by clicking the label), the underlying UI component may be notified to pull and display supplemental content for display to the user or to execute an underlying function that reverences an external activity 622. The external activity may be another application, such as a browser, dialer application, etc. that may perform the function (i.e., access an external webpage, dial a phone number, send an email, etc.).

Using the above described operation and configuration, the origin of the identification of an object represented by the digital entity is decoupled from the structure of the digital entity itself. The origin of the identification (i.e., whether a song was identified from a picture of a CD or from audio playing as detected by a device's microphone) may thus be shielded from a plugin. In one aspect, facets added to a digital entity by one plugin may be shielded (i.e., not shared) with other plugins. In another aspect, plugins may export their facets to allow other plugins to build on those facets. For example, a social media plugin may perform an identification by email address or face recognition, and then attach a facet to the digital entity that identifies the relevant account on that social site. Downstream plugins may be configured to add an additional post-identification experience based on that user's account.

Examples of plugin implementation into the augmented reality system pipeline are discussed below.

Figure 7:
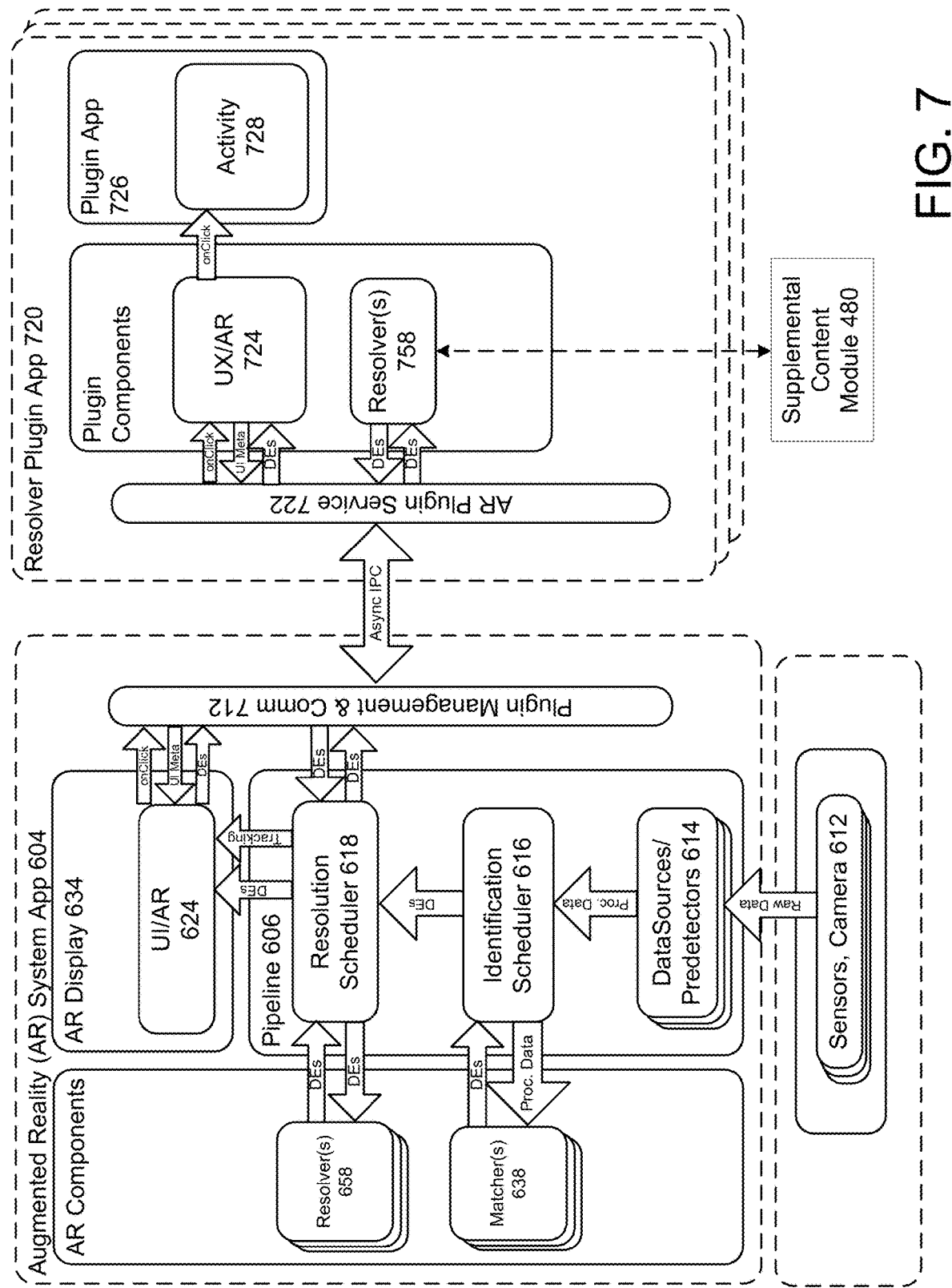
FIG. 7 is a block diagram conceptually illustrating operation of an extendable augmented reality system according to one aspect of the present disclosure.

FIG. 7 illustrates the augmented reality functionality with the AR system app 604 connected with a resolver plugin app 720. The resolver plugin may be used to provide additional supplemental content/functions that may be provided to a user based on an identified object as represented by a digital entity. As discussed above in regard to FIG. 6, the AR app 604 may run on the mobile device 110, on the server 140, or in some combination thereof. For example, the pipeline 606 may run on the mobile device 110 where the resolver(s) 658 and matcher(s) 638 may run on the server 140. The resolver plugin app 720 may be a component located remotely from the AR app 604 (for example on a separate plugin server 145) or may be a component of a same server or system as the AR app 604 (for example running as a local app on the mobile device 110). In another example certain portions of the resolver plugin app 720 may reside on a mobile device 110 (such as the UX/AR 724 and plugin app 726) whereas other components may reside on a separate plugin server 145 (such as the resolver(s) 758). Various configurations of the AR system and resolver plugin are possible. As illustrated, a plugin management and communication bridge 712 on the AR system app 604 communicates with the resolver plugin app 720. The communications may occur over a network, such as the Internet or across a local bus 524. Following reception of digital entries from the matcher(s) 638, the resolution scheduler 618 may invoke the plugin communication bridge 712 via a resolver proxy for each relevant plugin's resolver. The relevance of a particular plugin may be determined by a digital entity filter operating on the resolution scheduler 618 (or elsewhere).

The digital entity filter is used to engage the plugin extension of the AR system by filtering information that is sent to resolver plugins to ensure that resolver plugins only receive relevant digital entities to which the resolver plugin may add relevant facet data. The digital entry filter may describe AND, OR, NOT and OPTIONAL constructs that describe facets in the digital entity that are necessary for the filter match and eventual passing of the digital entity to the plugin. If a digital entity passes the filter, the digital entity may be sent to the plugin for resolution. Thus the digital entity filter may determine what data is operable by a particular resolver plugin. The digital entity may be scrubbed prior to sending, such that the digital entity passed to the plugin may only include facets that match the filter. As an example of filter operation, a plugin that is to be invoked on music identification may define a filter with one required element, namely for a facet with type-label "music." A plugin for a specific subset of music (for example, vintage music) may define a filter with a required element for a facet with type-label "music" and an attribute of "release date<1970." As another example, a plugin that handled apparel may define a filter with an element for a facet with type-label "product details" and attribute "department=shoes" or "department=clothing and accessories." Many other examples are possible. Thus, using the digital entity filter the AR system may filter objects that are sent to a particular resolver. Those objects may be filtered by type, by relevant feature, or based on specific objects (for example, a resolver may only be sent digital entities related to a specific person).

If the digital entity filter indicates that a digital entity should be passed to the plugin, the digital entity may be scrubbed and sent along with relevant facet data to the resolver plugin app 720, for example across an asynchronous inter-process communication (IPC). The plugin resolver(s) 758 may then resolve the digital entity to add additional facets. The resolver(s) 758 may also communicate with a separate supplemental content module 480 that may be located on the same device as the resolver(s) 758 or on a remote device. For example, again in the context of a concert ticket service, a resolver may determine an upcoming concert for a particular artist from an identified piece of music. The AR plugin service 722 may then perform other processes to adjust the new information to conform to the AR system such as inspecting for correctness, addressing security concerns, etc. The AR plugin service 722 may then send the additional data back to the AR app 604. The resolution scheduler 618 or other component may then add the new facet data to the corresponding digital entity residing on the AR app 604.

The remainder of the process may continue as described above in reference to FIG. 6. Further, when the user interacts with a UI component (e.g., ribbon) that results from data provided by the plugin, the AR app 604 may notify the plugin app 720 of the event. The user experience (UX)/AR 724 and activity 728 components may then provide the user with the supplement content or additional functionality associated with that UI component/data (for example redirecting the user to a particular website or pushing data to the user device, etc. in response to the user selecting the ribbon). The UX/AR 724 component may also output UI metadata (UI Meta) that may be used to display information regarding resolved entities.

In another aspect, a plugin may be configured to extend only the post-identification experience without necessarily involving an external resolver that adds additional information to a digital entity. This may be the case when a plugin is always relevant for a particular type of core AR identification, and the plugin does not need to fetch any additional data to support providing the post-identification experience managed by its user experience (UX)/AR 724 and activity 728 (or other) components. For example, a voice-over-internet-protocol (VOIP) application. Such an application's plugin may be configured to always receive a phone number identification from the AR app 604, providing an additional label and action to leverage the VoIP app to dial the number.

As explained above, an AR system may be configured to receive data regarding user selected objects and to recognize those objects when encountered again by users. To perform these operations, a plugin-type resolver may be configured for each user and may be configured to identify objects previously identified by the user or to identify related objects, such as objects similar to objects previously identified by the user or by related users. Such a user-specific resolver plugin may make user of user selection data or other data discussed above and may operate to filter data to be displayed on a device operated by the user so the resolver may identify such previously selected objects and prompt a device to notify a user of the identification.

A matcher plugin may be used to add new identification capabilities to the AR system. Although multiple configurations are possible, two particular variations of matcher plugins are illustrated here: sensor based matchers and corpus based matchers.

A sensor based matcher is a matcher that includes its own identification/recognition capabilities that may use similar or different algorithms from those used by the AR system's recognition module 430. For example, if an entity develops proprietary identification algorithms, but wants to interact with the AR system, it may do so through a sensor based matcher. Operation of a sensor based matcher plugin is described in reference to FIG. 8.

Figure 8:
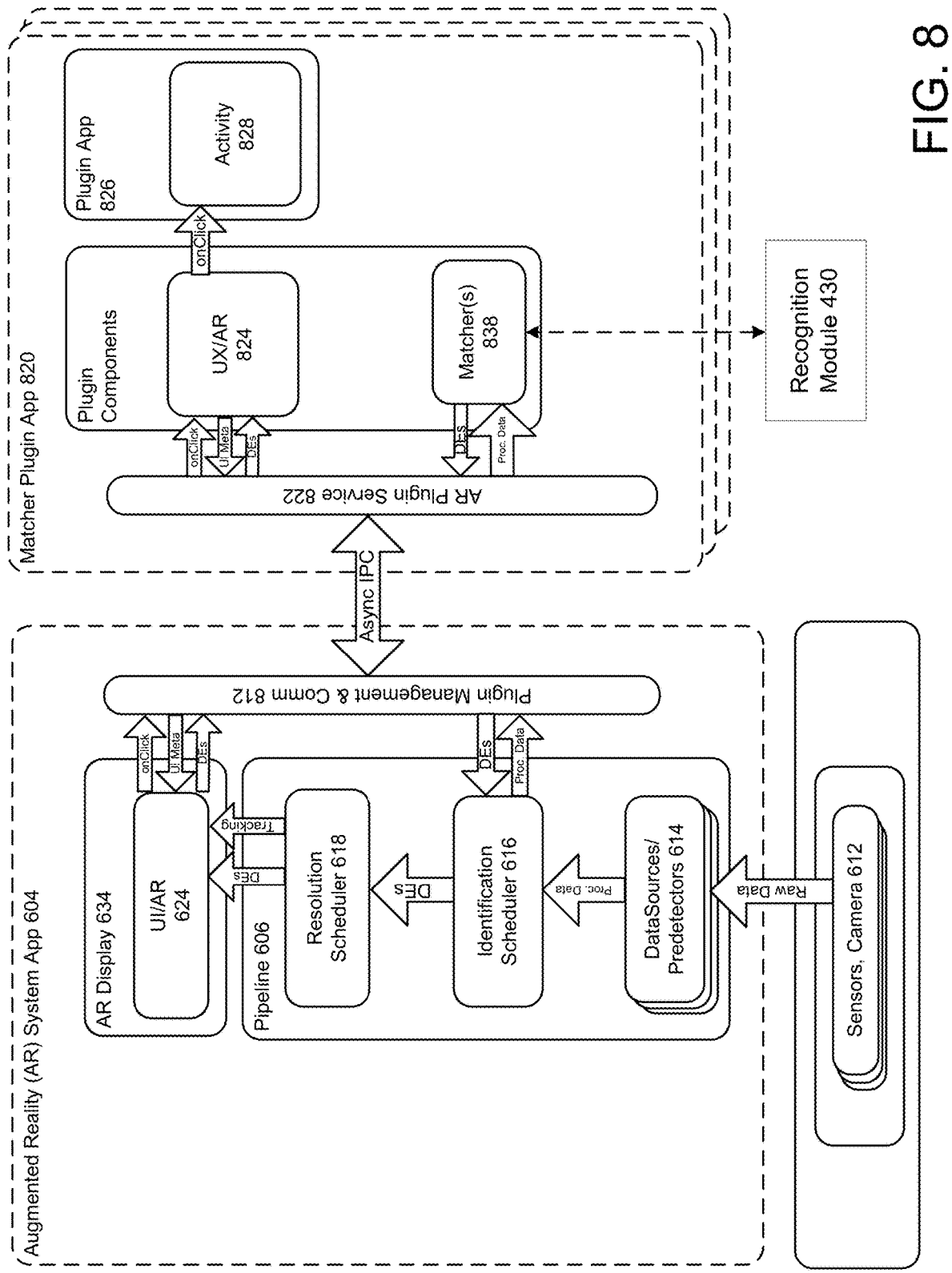
FIG. 8 is a block diagram conceptually illustrating operation of an extendable augmented reality system according to one aspect of the present disclosure.

FIG. 8 illustrates the augmented reality functionality with the AR system app 604 connected with a matcher plugin app 820. The matcher plugin may be used to allow the AR system to recognize new objects. As discussed above in regard to FIGS. 6 and 7, the AR app 604 may run on the mobile device 110, on the server 140, or in some combination thereof. The matcher plugin app 820 may be a component located remotely from the AR app 604 (for example on a separate plugin server 145) or may be a component of a same server or system as the AR app 604 (for example running as a local app on the mobile device 110). In another example certain portions of the matcher plugin app 820 may reside on a mobile device 110 (such as the UX/AR 824 and plugin app 826) whereas other components may reside on a separate plugin server 145 (such as the matcher(s) 838). Various configurations of the AR system and matcher plugin are possible. As illustrated, a plugin management and communication bridge 812 on the AR system app 604 communicates with the matcher plugin app 820. The communications may occur over a network, such as the Internet or across a local bus 524. Following reception of sensor data from various sensors 612, and processing of that data by data sources/predetectors 614, the identification scheduler may invoke several identification components (matchers) in parallel, including on-server matchers 638 (not shown in FIG. 8) and matchers operated by plugins such as matcher plugin app 820. Specific matchers for certain sensor data may be selected by a user (for example, a user indicating that data should be sent for analysis by a particular matcher), or may be determined by the AR system, for example using a sensor data filter.

The sensor data filter operates for matchers similarly to how the digital entity filter operates for resolvers. For each matcher plugin the AR system may configure a sensor data filter that indicates what particular sensor data is operable by a matcher plugin to perform its identification processes. If relevant sensor data becomes available, the AR system may invoke the particular matcher plugin and pass it the relevant sensor data. The sensor data filter may describe a type of sensor data a matcher may desire, but the filter can be more specific to request certain pre-processing occur, or even filter from a particular input source. For example, a plugin may indicate that it should be invoked on any raw picture data would define a filter with type=NV21. Or a plugin that should be invoked on picture data, but can only handle JPG encoding, may define a filter with type=JPG. Further, a plugin that requests only picture data that has text glyphs, and has been processed for a binarized mask may define a filter with type="OCR binarized mask." As another example, a plugin that wants raw NV21 picture data taken from a front facing camera (FFC) only may define a filter with type==NV21 AND source=FFC. Many other examples are also possible.

Although the term "sensor data" is used here to describe the operation of matcher plugins, it should be understood that such plugins may also work with non-live data, such as stored communications, stored photos or other data that is not taken directly from sensors. The sensor data filter may be configured to account for such data. Such data may be operated on similarly to sensor data. For simplicity, sensor data is used to describe system operation, but operation of matchers is not necessarily limited to data taken directly from such sensors.

After processed data passes through the sensor data filter, it may be serialized and sent to the matcher plugin 820. The AR plugin service 822 may operate on the processed data, for example deserializing the data and locally invoking the plugin's matcher 838. The matcher(s) 838 may communicate with a separate recognition module 430 that may be located on the same device as the matcher(s) 838 or on a remote device. The plugin's matcher 838 may apply its own identification algorithms, either locally or remotely, and produce a digital entity if an identification is made. For example, a social networking plugin may leverage face recognition to identify the profile of a "friend" of the logged in user. The plugin's digital entity may include a custom facet that describes the identification. The AR plugin service 822 may then operate on the digital entity (for example to check its formatting, security, etc.) and communicate the digital entity and included facet data to the AR app 604. The digital entity may be sent to the resolution scheduler 618. Based on the facets of the digital entity (either from the matcher plugin 820 or from elsewhere) the resolution scheduler 618 invokes one or more resolver(s) 658 (not shown in FIG. 8).

The remainder of the process may continue as described above in reference to FIG. 6. Further, when the user interacts with a UI component (e.g., ribbon) that results from data provided by the plugin, the AR app 604 may notify the plugin app 820 of the event. The user experience (UX)/AR 824 and activity 828 components may then provide the user with the supplement content or additional functionality associated with that UI component/data (for example redirected the user to a particular website, pushing data to the user device, etc.).

A corpus based matcher is a plugin that may lack an algorithm for performing identification, but rather includes an indexed corpus including information that may be used by an existing recognition/identification engine to recognize additional objects that the AR system may not otherwise recognize. Such a corpus based matcher plugin may work with an existing AR system to improve recognition capabilities, for example by adding resolvers 658 or adding to a recognition database 438. The corpus based matcher plugin may be remote or local depending on the size of the corpus of the matcher. A remote corpus based matcher may have a larger corpus than the local corpus based matcher. For example, a remote corpus based matcher may include a wine application that includes an exhaustive catalog of images of wine bottles and labels and corresponding prices, information about the wines, etc. A local corpus based matcher may include a smaller indexed corpus such as the collection of a small art museum, and information related to the collection. The corpus of a corpus based matcher plugin may be a component located remotely from the AR system and/or server or may be incorporated as a component of the AR system/server that performs AR processing.

The availability of corpus based matchers allows entities with large amounts of data, but without identification/recognition capability to leverage the existing AR system. The developer of the plugin may provide a corpus of assets (for example image or audio files) and corresponding unique identifiers to index against. The AR system may register an internal matcher (such as a matcher 638) and configure a sensor data filter to control data sent to the matcher. When sensor data for identification passes through the filter it may be sent to the matcher configured for the corpus plugin. The matcher of the AR system then attempts to perform an identification against the plugin's corpus. Upon a successful identification, the unique indexed ID may be forwarded to the plugin's matcher, which creates a digital entity and facet(s) to describe the identification. As an example, the AR system matches a corpus of wine labels and identifies one that is indexed against unique id "123987". The wine plugin component receives "123987", and contacts its web service to determine that this index is for a "1945 Chateau Mouton-Rothschild", and creates a facet with wine rating information for that bottle.

As discussed, a remote corpus based matcher may be used by a plugin that has a significantly large corpus of media (e.g., between 100 and 1,000,000 items). These assets may ingested and managed through a web based system, and the internal AR system matcher may contact a web service that will apply its algorithm against this database of assets when the associated plugin is installed and enabled.

The local corpus based matcher may be used by a plugin that has a small corpus of media (e.g., less than 100 items), and wants to leverage an AR system's identification algorithms on a user device. In this case a recognition algorithm for use with a local corpus based matcher may be configured to be more simplistic as it may be optimized for performance on a mobile device and configured to only look for objects within the small corpus. The local corpus based matcher is also suitable for a scenario where connectivity is not available, e.g., roaming on a mobile device in a museum in a foreign country, leveraging a museum painting guide plugin, or the like. In packaging a local corpus plugin application, a plugin developer may provide the set of media assets (i.e., images or audio files) associated with a unique ID. An AR tool may generate fingerprints for all assets, and package those with the plugin, for example with the plugin's application. Upon installation on a device, the plugin discovery and registration process may involve ingesting all fingerprints to the AR system's local storage (for example storage 508), so that local algorithms may be applied without binding to and invoking a plugin's service. Upon a successful identification the AR system may access the plugin service, invoking it with the corresponding unique ID of the identified object.

The AR system may be configured with a user specific matcher based plugin. Such a plugin may keep track of user designated content to associate with user selected objects. If a user selected object is identified, the AR system may pass a digital entity including the identifier of the previously selected object to the user matcher. The user matcher may then return data to the AR system regarding user content (such as a note, voice note, link, etc.) that the user chose to associate with the selected object. A user specific matcher (or other component) may also have access to user application such as contacts, calendar, etc. to add additional supplemental content/potential functions that may be identified in response to a particular user selected object.

A user may have a large library of applications that feature plugins. Those plugins may all be registered in the AR system, but the user may not want all plugins to be active. To support this, the AR system may allow explicitly enabling/disabling a plugin. There are other mechanisms to implicitly enable/disable a plugin, for example geo-fencing based on user location. For example, a group of plugins may be associated with a user's home location and may activate when the user is at home, whereas when the user leaves home and goes to work, another group of plugins may be activated. Various configurations are possible. Further, other plugins may be activated with regard to other locations, such as locations that feature specific objects for resolution. For example, a museum guide plugin, that provides information based on identified works of art, may be configured to be automatically enabled based on the user being in the museum (i.e., proximate to a specific geo-location). Another example may be a time based trigger. For example, a television show voting plugin may automatically be enabled X minutes before the show airs, and may remain enabled until the voting window ends.

The AR system may maintain a set of plugins that are enabled based on the enablement rules described above, however it will not bind to (i.e., access) the plugin to start the plugin application's process unless the plugin is deemed relevant to the current identification's context, thereby reducing unnecessary background processes. A plugin is deemed relevant, and therefore invoked, if the AR system matches a filter that is defined by the plugin, as described above. Through these filters, the AR system may determine relevance for all plugins without binding to and invoking each plugin and unnecessarily using system resources.

A plugin may be packaged as a regular mobile application, and may be obtained and installed from a mobile app store just as any other application. In this way, an existing mobile application can extend its existing application to add the AR plugin capabilities, rather than providing an entirely new application. An application may be designated as an AR system plugin by its configuration file (i.e. manifest). The configuration file may contain an "intent filter" that declares it is an AR filter. The configuration file may also declare the appropriate permissions. The configuration file may also export a service that may be used for inter-process communication with the AR system.

When a user installs any application on the mobile device, the AR system may detect an operating system (OS) level application installation event, and filter on applications that are plugins, based on the manifest entries above. The AR system may then bind to the plugin to obtain further configuration information and may register the plugin internally, including relevance and filtering information so that the AR system may determine when to invoke the plugin (for example using the filters discussed above). The AR system may also detect OS level application updated and deleted events, to register updates to plugins when they add or remove capabilities, as well as unregister plugins when the plugin application is removed from the mobile device.

A plugin may be sandboxed to execute within its own process. Asynchronous communication with the AR system may be performed by the exported plugin service, which extends an abstract service provided by the AR system to manage asynchronous IPC. Communication may always originate from the AR system to the plugin, and on each request a watchdog task is started within the AR system to ensure a timely response is received, or terminate the request. The watchdog time may be variable based on current measured network conditions. In other words an I/O bound plugin may be given more time to complete its request if the AR system observes sub-optimal network conditions. In addition, the embedded AR system may monitor the plugin process' CPU threadtime and network usage, response size, etc., to detect and terminate a rogue plugin process.

The system described above may result in an AR system, or mobile device, configured for operation with many different plugins. To reduce over-consumption of computing resources (i.e., CPU, memory, etc.) and to not overwhelm the user with identifications and/or potential follow-up functions, certain scheduling/prioritization techniques may be implemented to determine when certain plugins should be invoked over others. For example, a plugin's resolver may only be contacted one time for a relevant identification, and only if the prerequisite type of digital entity has been identified. By contrast, matcher based plugins may need to be invoked multiple times to yield a successful match. For example, when trying to identify a wine label, several invocations of the matcher may not yield an identification due to reflection and glare of an image, not having the entire label in view, and other factors. An intelligent scheduler may be used to schedule plugin components for execution, focusing on delivering results quickly to the user reducing overuse of system resources. Plugins may be prioritized by device (for example prioritizing different plugins for AR glasses 110b than for smartphone 110a), by location (prioritizing different plugins at the grocery store than at the movie theater), or by other factors or categories.

Using matchers as an example, one simple approach may be to schedule the invocation of matchers in a continually round-robin manner through all matchers, giving equal opportunity to each matcher. Due to limited resources, this may result in increased latency and potentially a missed identification. Instead, matchers and other plugin components may be scheduled based on several dimensions. In one example, internal AR components may be given priority over plugins. In another example, a plugin may be categorized as primarily processor or I/O bound based on based on measuring CPU threadtime & network usage during invocation. Thus the AR system may allow a web service to perform an identification rather than using on-device resources. A prerequisite to scheduling a matcher may be suitable sensor data. For example for a frame based matcher, the frame must have low motion, proper exposure, sufficient feature points, and meet a threshold for sharpness/focus. If these criteria are not match, the matcher may not invoked. Different users may gravitate to doing identifications for one plugin more than another. Those plugins that succeed historically for a particular user (or category of users) may be given preference. When multiple plugins typically return results (i.e., have historical success), users may gravitate to following the post-identification experience/function of one plugin over another. Plugins associated with the frequently activated functions may be given preference. Plugins may also be scheduled based on a fairness metric, to ensure a plugin component is not starved for more than a certain time period. If the matcher has repeatedly failed while looking at the "same scene", then that matcher's invocation may be delayed, until there is sufficient change in the scene. Metadata associated with matcher based plugins may leverage built-in AR pre-detectors, such as glyph detection, to give hints as to whether the matcher will be successful. A matcher that is configured with an AR pre-detector that is triggered may be given a higher scheduling priority. Other scheduling/ prioritization schemes are also possible.

Plugins may also provide customized follow-up experiences/functions based on relevant identifications. For example, the AR system may create various post-identification templates that a plugin developer can choose from. This enables everything from a slightly customized label, through to a complicated full screen, immersive experience with multiple sections of text, actions, and plugin assets. The AR system may then create and manage the set of UI elements through data provided by the plugin via the templates. In another example, remote views may be enabled that are generated and controlled remotely by the plugin's processes. The plugin may also provide UI assets that may interact with the AR system, such as the examples provided above in FIGS. 2 and 3.

When there are multiple relevant plugins that provide overlapping experiences/functions, the system may prioritize plugin post-identification visualizations based on various mechanisms such as which identification is centered, historical success and user-click through, how recently plugins were installed (such as giving newer plugins preference over older plugins, or vice-versa), or other factors.

Figure 9A:
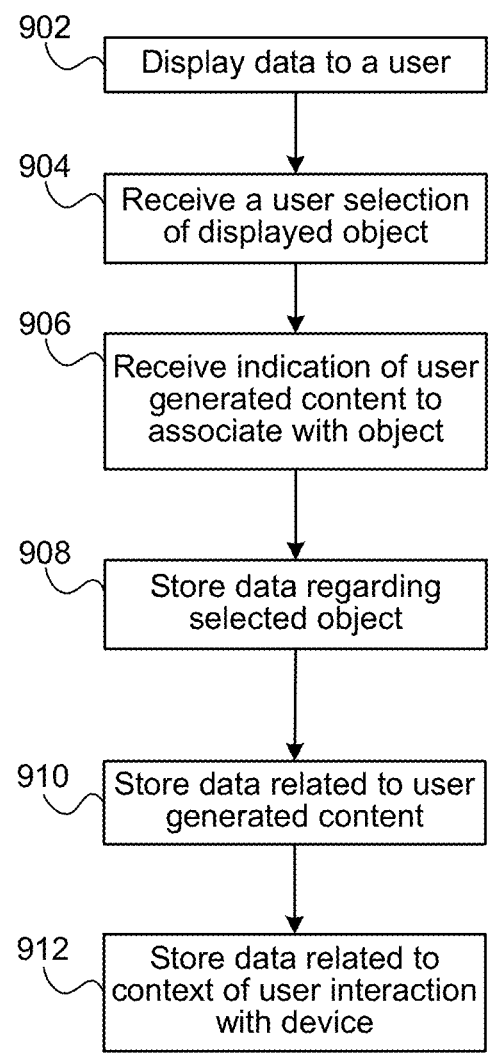
FIG. 9A is an example of an algorithm supporting a user-extended augmented reality computing system.

FIG. 9A is an example of an algorithm for selecting an object by a user and associating user content with that object. The algorithm of FIG. 9A may be performed by a server and/or a device. For illustration purposes, the algorithm is described as being performed by a device being operated by a user. The device displays data to a user (902). The device may then enter a recognition/user note mode (not pictured). The device then receives an indication of a user selection of a displayed object (904). The device then receives an indication of user generated content to associate with the object, such as a text note, audio note, video note, attachment, link, etc. (906). The device then stores data regarding the selected object (908) and stores data related to the user generated content (910). The data may be stored in a data structure for tracking user selection of objects. The device may also store context data related to the context of the user's interaction with the device when the object was selected (912). The context data may be stored in the same data structure described above or may be stored in another manner.

Figure 9B:
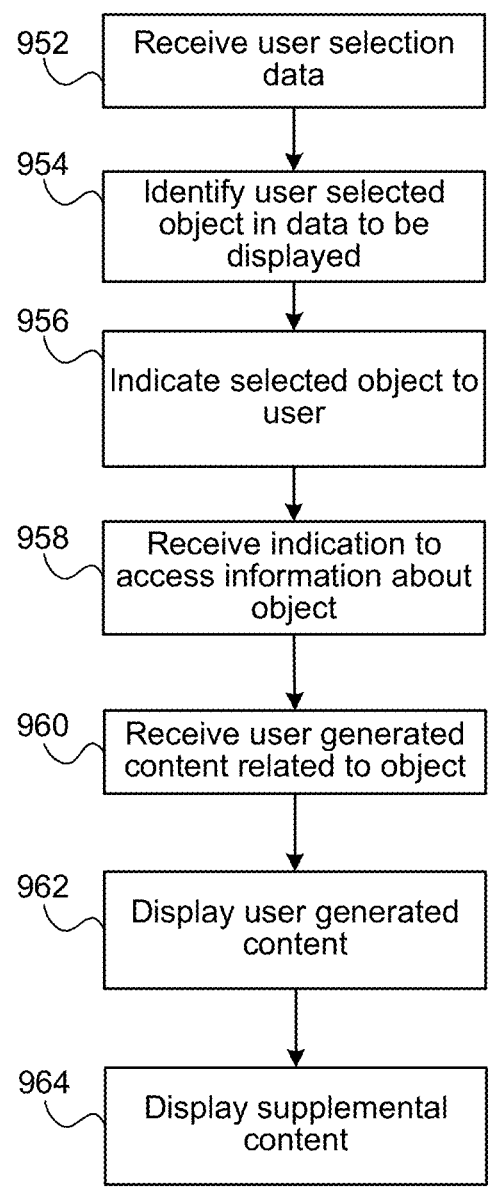
FIG. 9B is an example of an algorithm supporting a user-extended augmented reality computing system.

FIG. 9B is an example of an algorithm for identifying an object previously selected by a user in a later context. The algorithm of FIG. 9B may be performed by a server and/or a device. The device may be a different device than the device used by the user to select the object. For illustration purposes, the algorithm is described as being performed by a device being operated by a user. The device may receive user selection data (952) including data regarding one or more objects previously selected by a user. The device may then search data to be displayed on the device (or on a display associated with the device, such as a monitor) to identify an object previously selected by the user (954). When a user operates the device performing the algorithm of FIG. 9B, the user may be operating a different application than when the user selected the object as illustrated in FIG. 9A. After the object is identified in FIG. 9B, the device may then indicate the existence of the selected object to the user (956) for example through a visual or other indicator. The device may then receive an indication from the user to access information about the previously selected object (958). The device may receive user generated content related to the object (960). This step may also occur prior to receiving the user indication to access information about the object. The device may then display the user generated content (962) to the user. The system may also display supplemental content (964) such as supplemental content and/or additional functionality determined by the system (rather than the user) using other augmented reality functionality described above.

Referring to FIG. 10, different mobile devices 110a to 110e may contain different components of the system 100 and the devices may be connected over a network 1002 to one or more servers 140. For example, the smart phone 110a, and/or tablet computer 110c may each include the data collection module 530 and the classifier system 540, but the object recognition may be carried out using a recognition module 430 located at the server 140. In the same system, the laptop computer 110c may include the data collection module 530 and the classifier system 540. Also in the same system, the augmented reality (AR) glasses 110b and smart watch 110e may include the data reporting engine 532 of the data collection module 530, but object recognition may be carried out by components resident on the server 140. Similarly, the camera 110f may include the data collection module 530, but rely on a classifier system 540 located on the server 140. As same server or cluster of servers 140 may support each of these devices individually according to their individual capabilities within a same system. Other device examples may also be included in the system.

Based on the differences between mobile devices 110a to 110e, the sensors available, the collection and pre-processing of sensor data, the user information, previous user interactions with one or more devices, etc. the obtaining supplemental content related to recognition results and the determination of potential user-selectable functions may be different for each individual device 110a to 110e. For example, a smart watch 110e may be equipped with a camera to capture image data for recognition processing but may send the raw image data to the server 140 and rely on the server 140 for recognition processing and selection of potential user-selectable functions whereas smartphone 110a may perform some image processing (such as binarization) prior to sending image data to the server, whereas tablet 110d may perform some recognition on its own without relying on the server for such functions.

The various aspects can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most aspects utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In aspects utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C #or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of aspects, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate aspects may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various aspects.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
    at least one processor; and
    at least one memory including instructions that, when executed by the at least one processor, cause the computing system to:
    cause a first screen of a first device to display a first image comprising a first representation of an object;
    receive, while the first image is displayed on the first screen, input audio data representing speech of a user;
    perform speech processing on the input audio data to determine a first command to associate a note represented in the speech with the object;
    store, in a profile associated with the user, first data associating second data relating to note and the object, the profile being associated with an identifier for the user;
    after storing the first data, receive a second command from a second device to access information related to the object;
    determine that the second command is associated with the user;
    determine, using the identifier and based at least in part on the second command being associated with the user, that the profile is to be used to process the second command;
    identify the second data based at least in part on the first data stored in the profile; and
    cause a second screen of the second device to display a second image based at least in part on the second data and the first image.

2. The computing system of claim 1, wherein the at least one memory further includes additional instructions that, when executed by the at least one processor, further cause the computing system to:
    perform automated speech recognition processing on the input audio data to determine text data corresponding to the note.

3. The computing system of claim 1, wherein the at least one memory further includes additional instructions that, when executed by the at least one processor, further cause the computing system to:
    perform object recognition processing using the first image to determine results data; and
    include at least a portion of the results data in the first data.

4. The computing system of claim 3, wherein the at least one memory further includes additional instructions that, when executed by the at least one processor, further cause the computing system to:
    include in the second image a representation of the results data.

5. The computing system of claim 1, wherein the at least one memory further includes additional instructions that, when executed by the at least one processor, further cause the computing system to:
    determine, based at least in part on at least one of the input audio data or the first image, an object identifier corresponding to the object; and
    include the object identifier in the first data.

6. The computing system of claim 1, wherein the at least one memory further includes additional instructions that, when executed by the at least one processor, further cause the computing system to:
    determine previously stored user selection data corresponding to the object; and
    include in the second image a representation of the previously stored user selection data.

7. The computing system of claim 1, wherein the at least one memory further includes additional instructions that, when executed by the at least one processor, further cause the computing system to:
    cause the second screen to display the second image at least in part by causing the second screen to display the note in association with the first image.

8. A computer-implemented method, comprising:
    causing a first screen of a first device to display a first image comprising a first representation of an object;
    receiving, while the first image is displayed on the first screen, input data representing speech of a user;
    performing speech processing on the input data to determine a first command to associate a note represented in the speech with the object;
    storing, in a profile associated with the user, first data associating second data relating to note and the object, the profile being associated with an identifier for the user;
    after storing the first data, receiving input audio data from a second device;
    performing speech recognition on the input audio data to determine a second command to access information related to the object;
    determining that the second command is associated with the user;
    determining, using the identifier and based at least in part on the second command being associated with the user, that the profile is to be used to process the second command;
    identifying the second data based at least in part on the first data stored in the profile; and
    causing a second screen of the second device to display a second image based at least in part on the second data and the first image.

9. The computer-implemented method of claim 8, further comprising:
    causing the first screen of the first device or a third screen of a third device to display a third image;
    performing object recognition processing on the third image to determine the third image includes a second representation of the object; and
    based at least in part on the third image including the second representation and the first data associating the second data and the object, causing the first screen of the first device or the third screen of the third device to display an indication of the note.

10. The computer-implemented method of claim 8, wherein performing the speech processing on the input audio data comprises performing automated speech recognition processing on the input audio data to determine text data corresponding to the note.

11. The computer-implemented method of claim 8, further comprising:
    determining, based at least in part on at least one of the input audio data or the first image, an object identifier corresponding to the object; and
    including the object identifier in the first data.

12. The computer-implemented method of claim 9, further comprising:
    determining previously stored user selection data corresponding to the object; and based at least in part on the third image including the second representation, causing the first screen of the first device or the third screen of the third device to display a representation of the previously stored user selection data.

13. The computer-implemented method of claim 8, further comprising:
performing object recognition processing using the first image to determine results data; and
including at least a portion of the results data in the first data.

14. The computer-implemented method of claim 13, further comprising:
including in the second image a representation of the results data.

15. The computer-implemented method of claim 8, further comprising:
determining previously stored user selection data corresponding to the object; and
including in the second image a representation of the previously stored user selection data.

16. The computer-implemented method of claim 8, wherein:
causing the second screen to display the second image further comprises causing the second screen to display the note in association with the first image.

17. The computer-implemented method of claim 8, further comprising:
causing the first screen of the first device or a third screen of a third device to display a third image;
determining that the third image is associated with the user; and
determining, using the identifier and based at least in part on the third image being associated with the user, that the profile is to be used to determine content associated the third image.

18. The computer-implemented method of claim 17, wherein causing the first screen of the first device or the third screen of the third device to display the third image comprises displaying the note in association with a second representation of the object.

* * * * *